US012404699B2

(12) United States Patent
Caines et al.

(10) Patent No.: US 12,404,699 B2
(45) Date of Patent: Sep. 2, 2025

(54) FOOT-OPERATED SYSTEMS AND DEVICES FOR HANDLESS OPERATION OF A DOOR

(71) Applicant: AZTECH INDUSTRIAL DEVICES LLC, Carlsbad, CA (US)

(72) Inventors: Marcus A. Caines, San Diego, CA (US); Theodore Tillinghast, Vista, CA (US); Clarke A. Caines, Carlsbad, CA (US)

(73) Assignee: AZTECH INDUSTRIAL DEVICES LLC, Carlsbad, CA (US)

( * ) Notice: Subject to any disclaimer, the term of this patent is extended or adjusted under 35 U.S.C. 154(b) by 0 days.

(21) Appl. No.: 18/316,930

(22) Filed: May 12, 2023

(65) Prior Publication Data

US 2023/0279698 A1 Sep. 7, 2023

Related U.S. Application Data

(63) Continuation-in-part of application No. 17/522,789, filed on Nov. 9, 2021, now Pat. No. 12,024,926.

(60) Provisional application No. 63/341,569, filed on May 13, 2022, provisional application No. 63/113,699, filed on Nov. 13, 2020.

(51) Int. Cl.
*E05B 53/00* (2006.01)

(52) U.S. Cl.
CPC .................................. *E05B 53/001* (2013.01)

(58) Field of Classification Search
CPC ............................... E05B 53/001; E05F 13/02
See application file for complete search history.

(56) References Cited

U.S. PATENT DOCUMENTS

| | | | | |
|---|---|---|---|---|
| 1,583,818 A | 5/1926 | White | | |
| 1,603,722 A | 10/1926 | Stanley | | |
| 2,741,504 A | 4/1956 | Dale | | |
| 4,569,546 A | 2/1986 | Howard | | |
| 4,621,848 A * | 11/1986 | Pierce | E05B 53/001 | 292/336.3 |
| 5,217,265 A | 6/1993 | Lerner | | |
| 5,725,263 A * | 3/1998 | Rodriguez | E05C 17/48 | 292/342 |
| 6,176,042 B1 | 1/2001 | Rossman | | |
| 6,360,488 B1 | 3/2002 | Darling | | |
| 6,967,580 B1 * | 11/2005 | Schulze | G08B 25/016 | 340/568.1 |

(Continued)

FOREIGN PATENT DOCUMENTS

| | | |
|---|---|---|
| CN | 211598112 U | 9/2020 |
| DE | 202020101984 U1 | 4/2020 |

(Continued)

*Primary Examiner* — Mark A Williams
(74) *Attorney, Agent, or Firm* — DICKINSON WRIGHT RLLP; Mark W. Catanese

(57) ABSTRACT

Systems, devices, and methods are provided herein for the handless operation of a door. Illustrative examples of a system disclosed herein include a user interaction assembly configured to be disposed at a bottom edge of the door, the user interaction assembly configured to generate a signal, a push-lock assembly configured to attach to a door handle external to a mounting rose of the door handle, and the push-lock assembly configured to receive the signal from the user interaction assembly and translate the signal into rotational movement configured to operate the door handle.

17 Claims, 16 Drawing Sheets

(56) References Cited

U.S. PATENT DOCUMENTS

| | | | | |
|---|---|---|---|---|
| 7,270,352 | B1 * | 9/2007 | Stuart | E05B 1/0053 292/336.3 |
| 7,788,954 | B2 | 9/2010 | Schumm | |
| 8,707,622 | B1 | 4/2014 | Neustel, Jr. | |
| 8,745,922 | B1 | 6/2014 | Matsuda | |
| 8,888,149 | B2 * | 11/2014 | Lehr | E05B 53/001 292/201 |
| 9,145,713 | B1 * | 9/2015 | Norris | E05B 53/00 |
| 9,347,252 | B2 | 5/2016 | Klein | |
| 11,053,718 | B2 * | 7/2021 | Finley | E05C 19/003 |
| 2007/0256362 | A1 | 11/2007 | Hansen | |
| 2013/0118085 | A1 * | 5/2013 | Hedemark | F16H 21/44 49/504 |
| 2013/0318882 | A1 | 12/2013 | Booker | |
| 2014/0353985 | A1 | 12/2014 | Klein | |
| 2015/0020454 | A1 * | 1/2015 | Klein | E05F 11/54 49/267 |
| 2017/0218661 | A1 * | 8/2017 | Fraychineaud, Jr. | E05B 1/0053 |
| 2019/0128022 | A1 | 5/2019 | Markway | |
| 2021/0310272 | A1 * | 10/2021 | Chu | E05B 53/001 |
| 2021/0332614 | A1 * | 10/2021 | Taylor | E05B 47/0001 |
| 2022/0154494 | A1 * | 5/2022 | Caines | E05F 13/02 |

FOREIGN PATENT DOCUMENTS

| | | | | |
|---|---|---|---|---|
| EP | 1048811 | | 11/2000 | |
| EP | 1889990 | | 2/2008 | |
| EP | 1889990 | A2 * | 2/2008 | E05B 1/0053 |
| WO | 2016037600 | | 3/2016 | |

* cited by examiner

FOOT-OPERATED SYSTEMS AND DEVICES FOR HANDLESS OPERATION OF A DOOR

REFERENCE TO RELATED APPLICATION

The present application is a continuation-in-part of and claims priority to U.S. patent application Ser. No. 17/522,789, filed on Nov. 9, 2021 and titled "FOOT-OPERATED SYSTEMS AND DEVICES FOR HANDLESS OPERATION OF A DOOR," now U.S. Pat. No. 12,024,926, which claims priority to U.S. Provisional Patent Application Ser. No. 63/113,699, filed on Nov. 13, 2020 and titled "Foot-Operated Systems and Devices for Handless Operation of a Door," the disclosures of which are incorporated herein by reference in their entirety.

The present application also claims priority to U.S. Provisional Patent Application Ser. No. 63/341,569, filed on May 13, 2022 and titled "Foot-Operated Systems and Devices for Handless Operation of a Door," which is incorporated herein by reference in its entirety.

BACKGROUND

Technical Field

This disclosure relates to hands free operation of a door. More specifically, this disclosure relates to foot operated devices and systems that provide for operation of the door, without the need for a user to interact with a doorknob or handle.

Description of the Related Art

In a world impacted by the spread of infectious disease, doorknobs and handles are among the dirtiest, most used surfaces within homes, restaurants, and bathrooms. Once the knob or handle is contaminated, each user thereafter opening or closing the door encounters the risk of being infected and contracting a cold, flu, coronavirus, or other disease. Contamination is best avoided by careful hand washing; however, many people using public facilities exhibit less than exemplary hygiene and either inadequately wash their hands or fail to wash them altogether. As a result, unsanitary and contaminated doorknobs and handles continue to be a health concern.

The present disclosure is directed toward overcoming the problems identified above.

SUMMARY

The present disclosure, in accordance with one or more various embodiments, is described in detail with reference to the following figures. The figures are provided for purposes of illustration only and merely depict typical or example embodiments.

The disclosure describes a system comprising a door handle operating assembly and user interaction assembly designed for contactless usability when opening/closing your latched door. The design is simple to use and can help anyone get through any door with ease. The design makes it so opening a latched door can be done without using one's hands, thus mitigating risk of spreading bacteria. The ability to open latched doors this way will be most beneficial to hospitality and industrial businesses that require their employees/doctors to sterilize multiple times throughout the day.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DESCRIPTION

Figure 1:
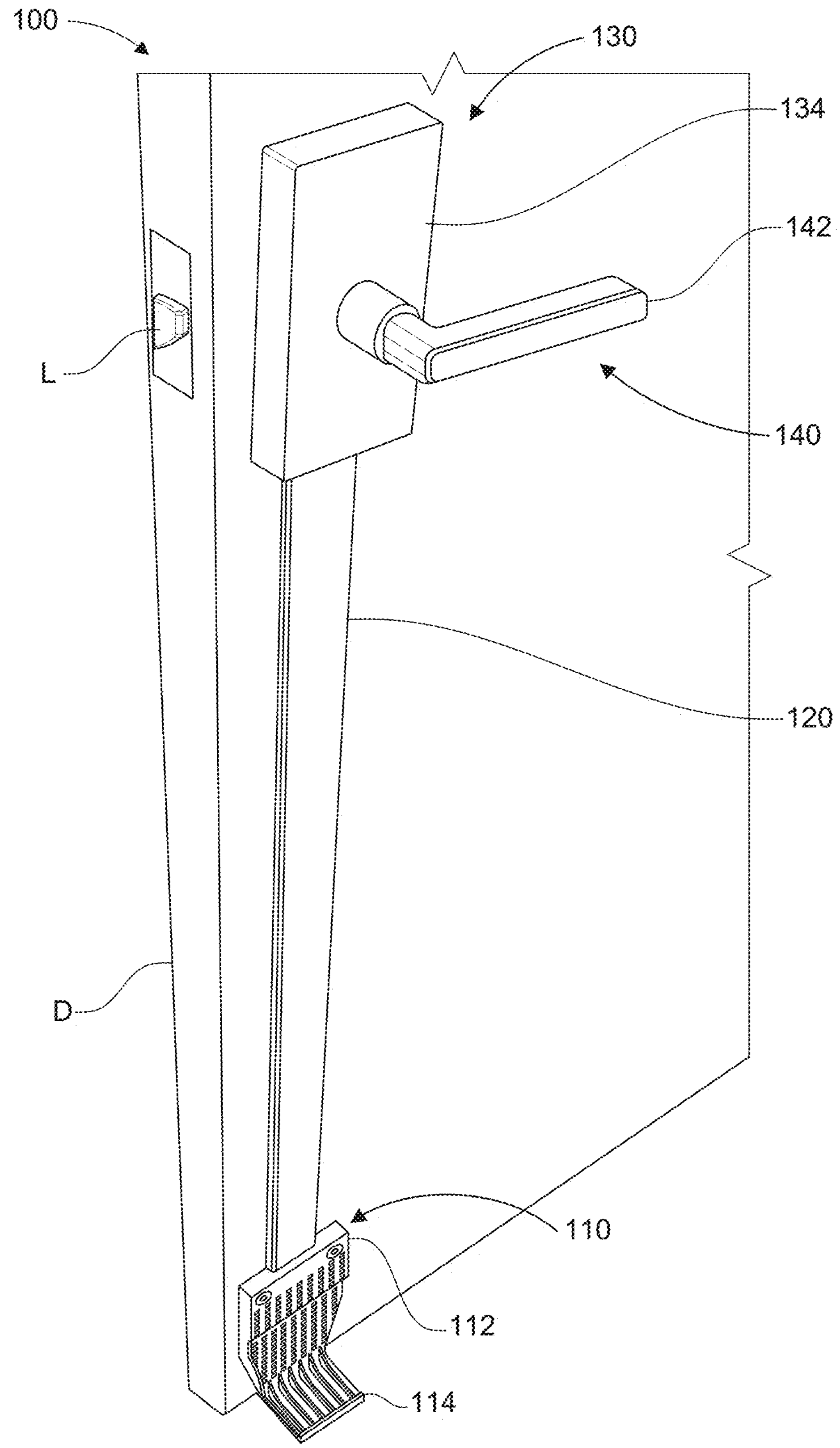
FIG. 1 is a schematic drawing of an embodiment of a system for handless operation of a door in a first state, in accordance with embodiments disclosed herein.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

References throughout this specification to one/an "implementation", "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present disclosure is directed to the methods, apparatus, systems, and assemblies designed for contactless usability when opening/closing a latched door. Embodiments herein provide a system for the handless operation of a door that is configured to attach to an existing door handle assembly and provide for user interaction at a location that is spaced apart from a door handle assembly. For example, a push-lock mechanism can be attached to a handle of a door handle assembly on the door, and configured to operate (e.g., turn) the handle in response to interaction with a user interaction assembly physically or wirelessly coupled to the push-lock mechanism, without the need of the user to grasp or otherwise turn the handle using their hand. The user interaction assembly can thus be positioned at any location separate from the door handle assembly. In an illustrative example, the user interaction assembly can be comprised of a food pedal and the push-lock mechanism can be configured to operate (e.g., turn) the handle in response to operating the foot pedal. Upon operating the foot pedal, according to some embodiments, the push-lock mechanism may be employed to open an unlatched door, for example, by converting an upward translational force to a rotational force that rotates the door handle to unlatch and open the door. Alternatively, a pulling force may also be applied to the push-lock mechanism that may open the door. In yet another example, operating the foot pedal may generate a signal that can be used to trigger the push-lock mechanism to operate the door handle assembly.

The design is simple to use and can help anyone get through any door with ease. The design makes it so that opening a latched door can be done without using one's hands, thus mitigating the risk of spreading bacteria. The ability to open latched doors this way will be most beneficial to hospitality and industrial businesses that require their employees/doctors to sterilize multiple times throughout the day.

Another benefit of the embodiment disclosed herein is opening doors when one's hands are full. There's nothing worse than loading up your arms with groceries, laundry, or whatever it may be and realizing you've forgotten to open the door beforehand. Embodiments disclosed herein provide for operating a door without hands. Furthermore, embodiments herein also make it easier for children, or those who may not be able to reach a door handle, to open doors.

Some embodiments herein comprise a knurled surface on a user interaction assembly that allows for optimal grip when opening/closing a latched door. Additionally, embodiments herein are easy to install on any doorway because the embodiments disclosed herein fit to any doorway seamlessly. To assemble, one may install the door handle as normal, attach the push-locking mechanism into the bottom of the door handle (e.g., external to the mounting rose along the spindle), do the same with the user interaction assembly, and finally attach the user interaction to the bottom of the door for stability. Once complete, the user interaction assembly will supply the capability that the door handle would, and may operate to lock the door handle.

Figure 2:
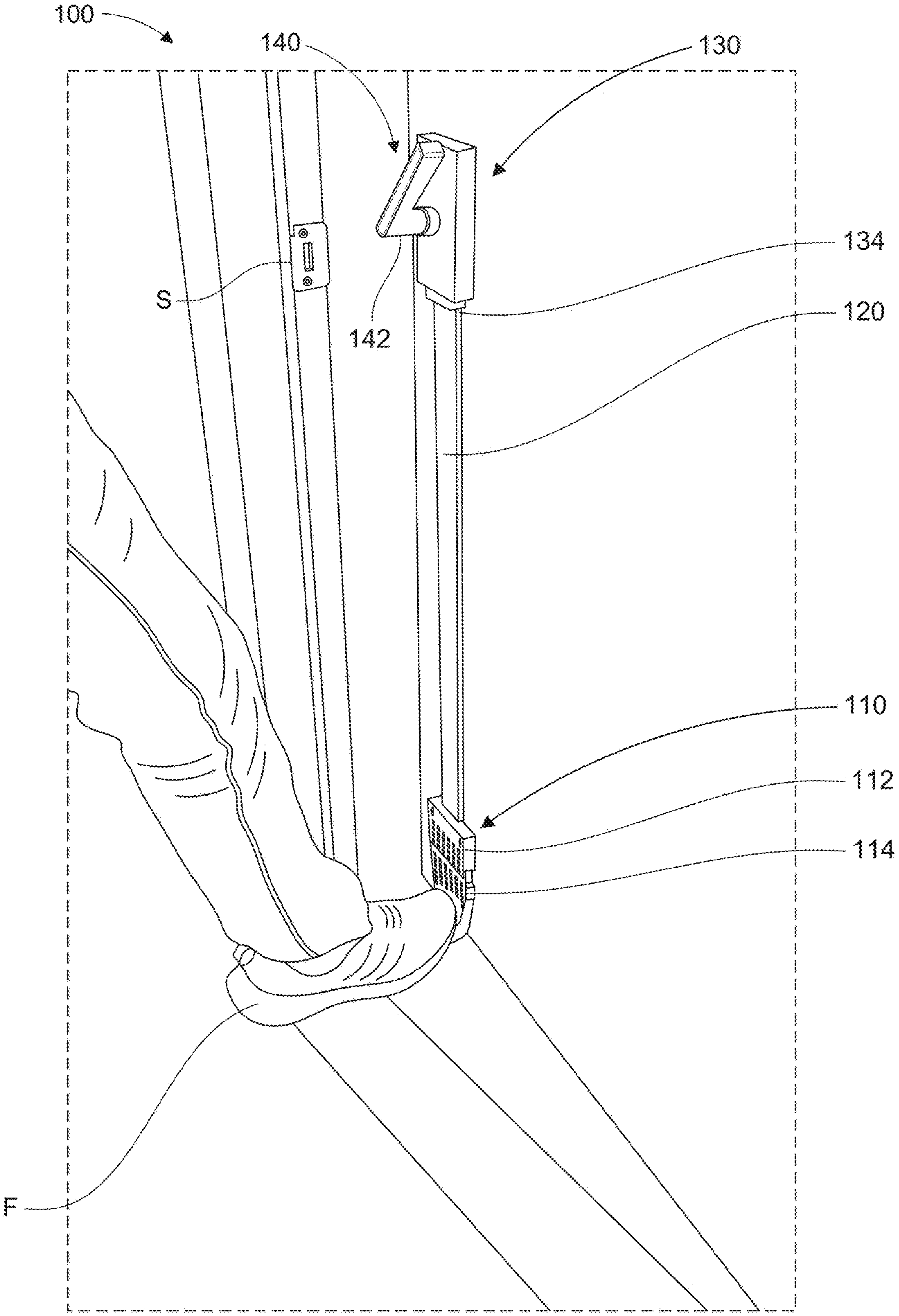
FIG. 2 is a schematic drawing system for the handless operation of FIG. 1 in a second state.

FIGS. 1 and 2 are schematic drawings of a system 100 for handless operation of a door D in accordance with embodiments disclosed herein. System 100 comprises a user interaction assembly 110 and communication medium 120. The communication medium 120 is coupled to the user interaction assembly 110 and a door handle operating assembly 130, which comprises a push-lock mechanism. The system 100 can be used to operate a door handle assembly 140 to disengage a latch L from a strike plate S of a door frame (not shown) and allow a user to open the door through user interaction with the user interaction assembly 110. In this way, the user need not grasp or otherwise make physical contact with the door handle 140.

In the embodiments disclosed herein, such as shown in FIG. 1, the door handle need not be disassembled to install the push-lock mechanism. The communication medium 120 may be attached to a door handle via the door handle assembly 140, in accordance with the embodiments disclosed herein. Thus, the system 100 may be connected to an existing door handle assembly 140.

As alluded to above, the system 100 may be connected to an existing door handle assembly 140, without requiring access to internal mechanisms of the door handle. For example, a conventional door handle (such as a lever door handle assembly 140 shown in FIG. 1) comprises two handles (such as knobs, levers, etc.)— one on each side of the door (one example door handle is shown in FIG. 1 as handle 142). The handles are each connected to a mounting rose (or rosette), which is a plate that conceals and secures internal mechanisms of the door handle. The internal mechanisms of the door handle include a spindle, which is generally a square bar that connects both handles. The spindle passes through the mounting rose and is connected to the handle. The handle may include a housing or sleeve configured to receive a portion the spindle that extends externally to the door from the mounting rose to the handle. The housing or sleeve may include a handle extender in some implementations. A spindle interfacing component may be positioned within the sleeve such that the spindle interfacing component is stationary relative to the handle. The spindle interfacing component is configured to receive an end of the spindle extending from the mounting rose toward the handle and interlock the spindle with the handle, such that rotation of the handle is transferred to the spindle via the spindle interfacing component. The spindle interfacing component may generally comprise a square shaped hole extending along it length to receive the spindle for receive a square bar spindle. The internal mechanisms also include a latch assembly that is generally a spring-loaded bolt, which can be operated by rotating the spindle to engage or disengage a latch from a strike plate on a door frame. System 100 can be connected to the conventional door handle external to the mounting rose, such that a user need not access the internal mechanisms. In the example shown in FIG. 1, door handle operating assembly 130 can be installed between the door handle 142 and a mounting rose. As will be described in greater detail below, the door handle operating assembly 130 can be coupled to a portion of the spindle that resides externally to the mounting rose and can be used to rotate the spindle so as to disengage or engage a latch from a strike plate.

While the examples provided herein illustrate the door handle operating assembly 130 attached to a lever style door handle assembly 140, the embodiments disclosed herein are not limited to lever style door handles. The embodiments disclosed herein may be applied to any style of door handle assembly, such as knob style door handles and any other mechanisms for operating a latch.

In the illustrative example of FIG. 1, the communication medium 120 is provided as an arm member 120. The arm member 120 may include one or more plates of material, rods of material, wires, or any medium that physically couples to the user interaction assembly 110 to the door handle operating assembly 130. Through physical coupling, operation of the user interaction assembly 110 can be transferred to door handle operating assembly 130, which operates the door handle assembly 140 to unlatch the door (e.g., disengage the latch from the strike plate). The user may then move their foot using a pushing or pulling motion at the user interaction assembly 110 to open and/or close the door. In another example, the communication medium may be a wired or wireless communication medium that provides for exchange of electrical or wireless signals from the user interaction assembly 110 to the door handle operating assembly 130. In this example, the arm member 120 may need not be included and instead system 100 uses a wired or wireless communication, such as antennas, transmitters, receivers, and the like, to communicate a signal to trigger operation of door handle operating assembly 130.

Figure 5:
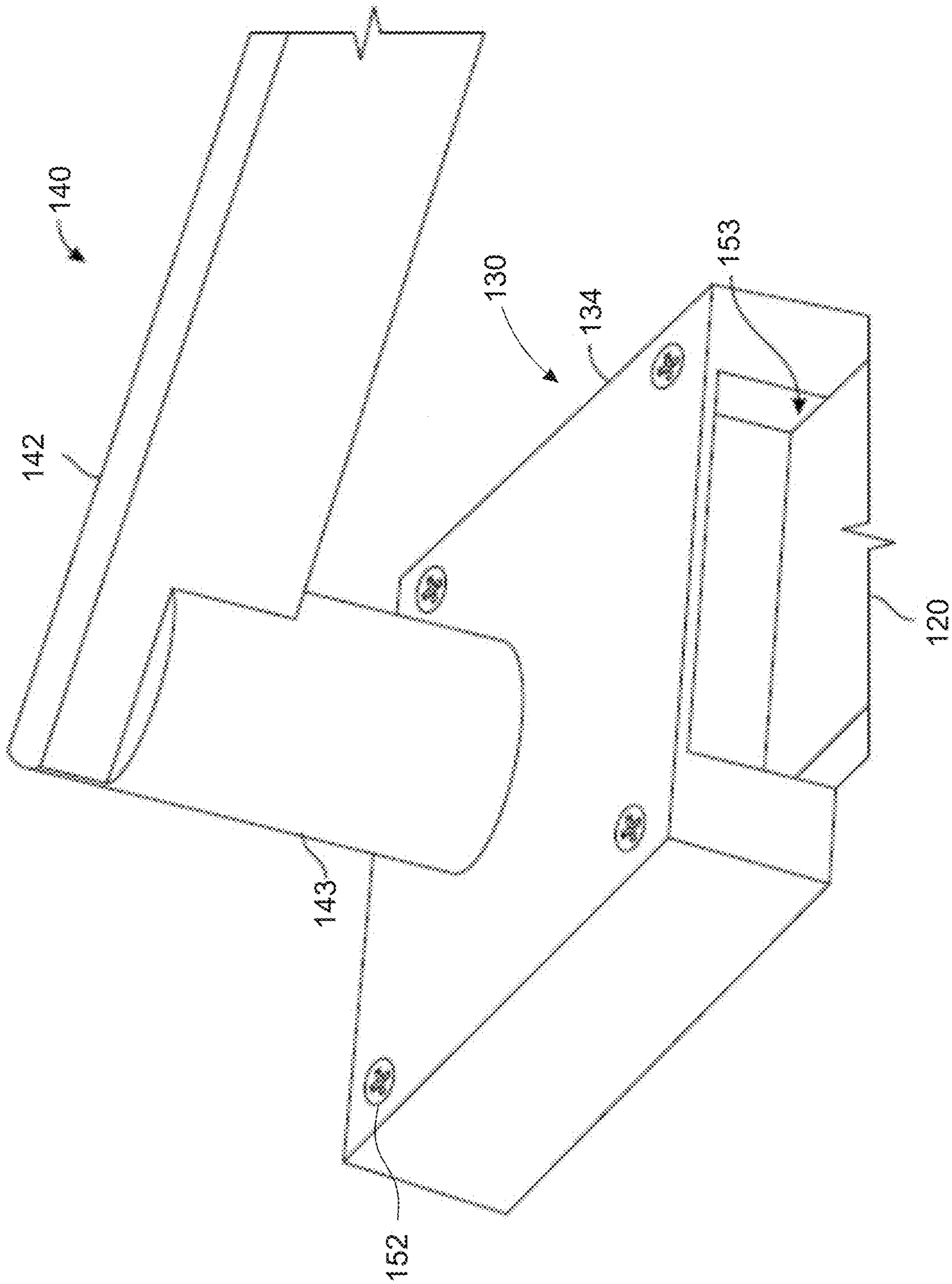
FIG. 5 is a schematic graphical representation of an example door handle operating assembly, included as part of the system of FIG. 1, coupled to a door handle assembly.

In operation, the user interaction assembly 110 may be configured for foot detection and/or actuation to generate a signal, which can be communicated to the door handle operating assembly 130 via the communication medium 120. For example, user interaction assembly 110 may be referred to as a foot pedal assembly that a user can interact with using his/her foot. As another example, user interaction assembly 110 may be sensors that can detect the presence of a foot. In either case, the door handle operating assembly 130 converts the signal to rotational movement that operates door handle assembly 140. Thus, there is no need for a user to contact the door handle itself (e.g., by grasping the handle). In some examples, the generated signal is a translational force that is received at the door handle operating assembly 130 as a translational movement via the communication medium as an arm member 120. The door handle operating assembly 130 then converts the translational movement to rotational movement. In another example, the signal may a communicated via a wired or wireless signal indicating that a foot has been detected, which is communicated via the communication medium (e.g., wired or wireless communication mediums) as electrical or wireless signals to the door handle operating assembly 130 (FIG. 5). The door handle operating assembly 130 may receive the signal, activate one or more actuators, and generate the rotational movement accordingly.

In the illustrative example of FIG. 1, the communication medium is an arm member 120 that is physically coupled to the door handle operating assembly 130 at upper end and the user interaction assembly 110 at a lower end. The arm member 120 is configured to communicate a translational force from the user interaction assembly 110 into translational movement applied to the door handle operating assembly 130. The user interaction assembly 110 may be configured to convert foot actuation into the translational force that is applied to the lower end of the arm member 120. The arm member 120 then communicates the translational force to the door handle assembly as translational movement. The door handle operating assembly 130 converts the translation movement to rotational movement to operate door handle 142. Thus, there is no need for a user to contact the door handle itself (e.g., by grasping the handle).

FIG. 1 illustrates the system 100 in a first position or state, for example, in a latched state. The latched position may refer to a resting state, for example, when the door is not currently operated by a user and the latch of the door handle is engaged with the door. FIG. 2 illustrates the system 100 in a second position or state, for example, an unlatched state. The unlatched state may refer to a user engaged or user operating state and the system is engaged to open the door such that the latch is no longer engaged with the door. The unlatched state may be a result of user engagement or operation with the user interaction assembly 110 by a foot F of the user, as shown in FIG. 2.

Figure 3B:
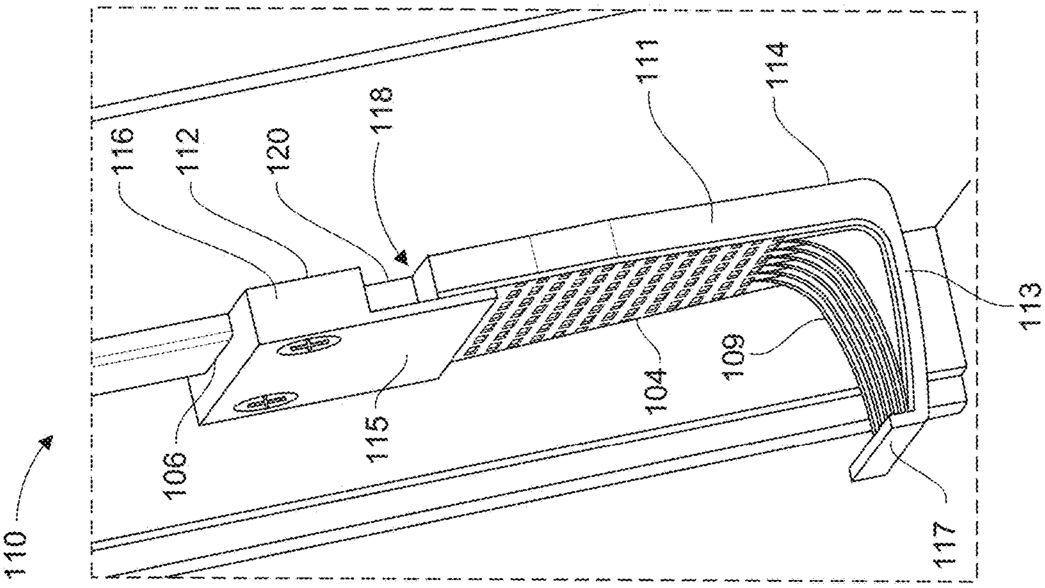
FIGS. 3A and 3B are schematic drawings of user interaction assembly, included as part of the system of FIG. 1.
Figure 3A:
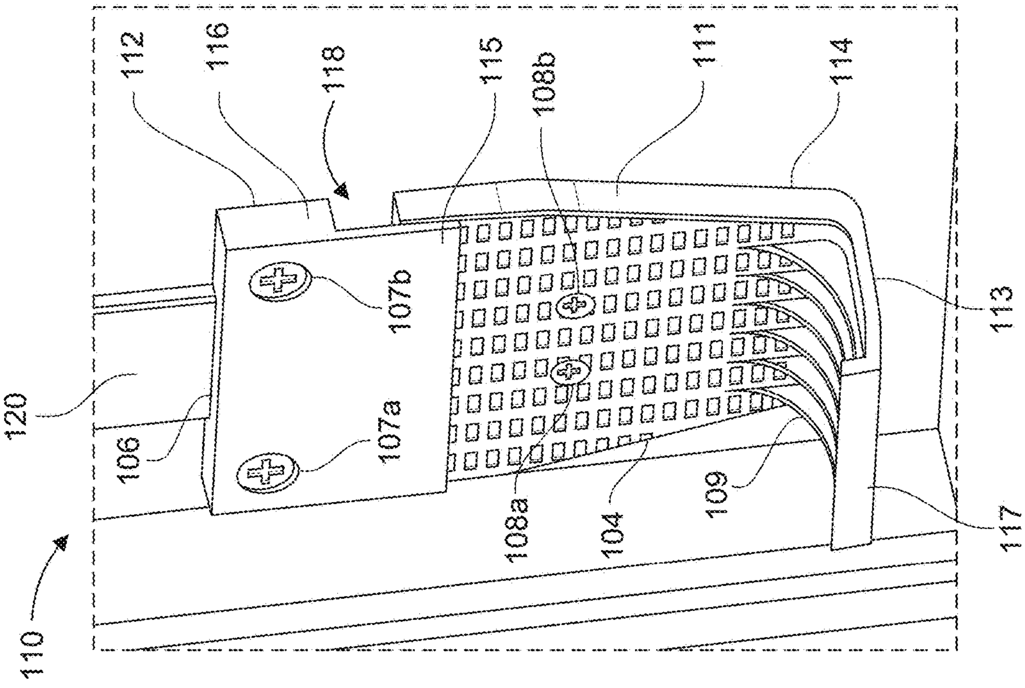
Figure 4B:
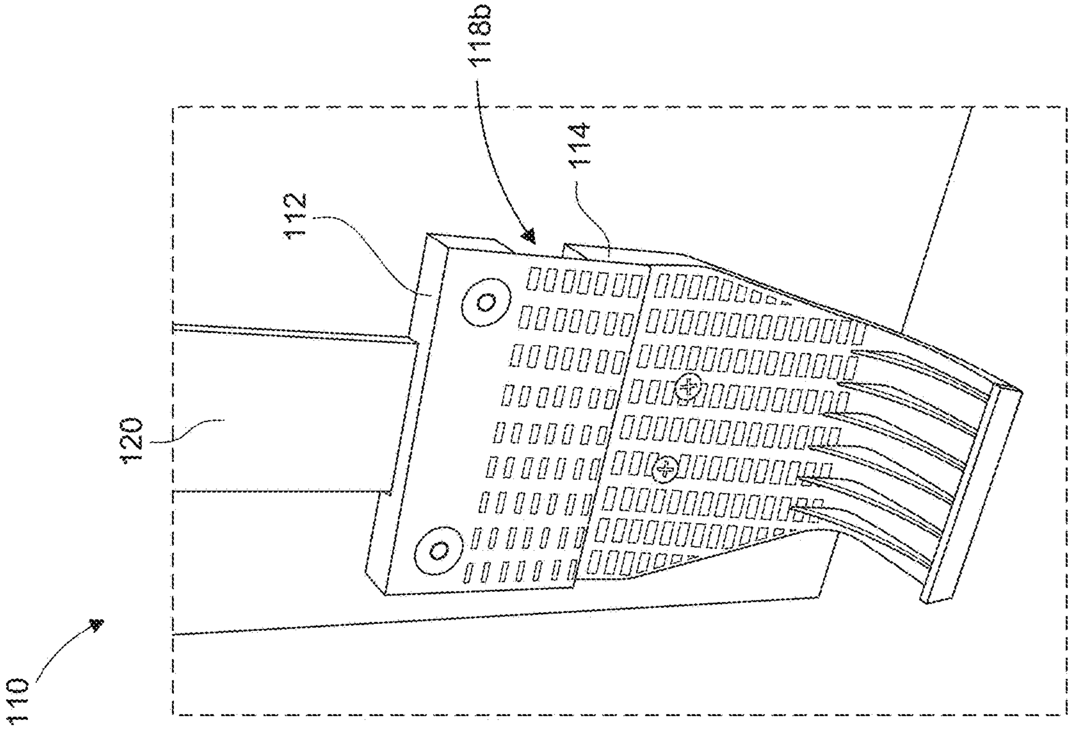
FIGS. 4A and 4B are schematic drawings of the user interaction assembly of FIGS. 3A and 3B in the first and second states, respectively.
Figure 4A:
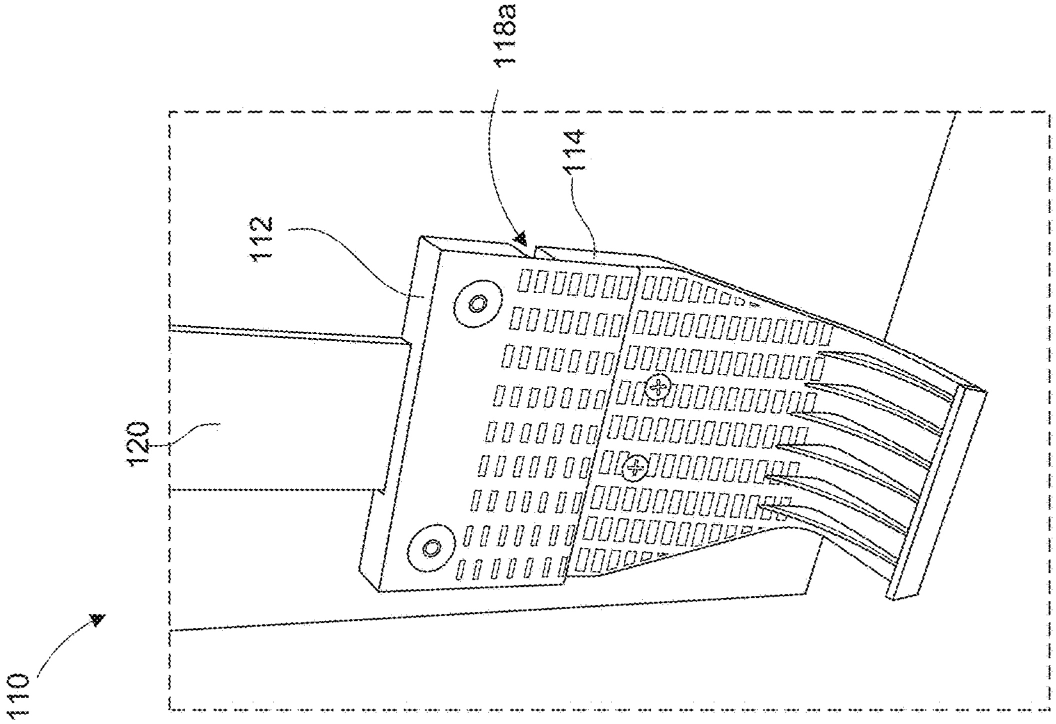

FIGS. 3A-3B and 4A-4B illustrate the user interaction assembly 110 according to an embodiment disclosed herein. FIGS. 3A and 3B are schematic drawings of the user interaction assembly 110 at different perspective views. FIGS. 4A and 4B provide schematic drawings of the user interaction assembly 110 in the unlatched state (user interaction assembly 110*a*) and the unlatched state (user interaction assembly 110*a*), respectively.

The user interaction assembly 110 comprises an L-shaped component 114 (sometimes referred to as a kick-and-pull component, foot pedal, or a bracket), and an anchor component 112. In the illustrative examples herein, the L-shaped component 114 comprises a knurled surface 104 on which the user's foot interacts. In another example, the L-shaped component 114 may have other textured surfaces on which the user's foot interacts. The texture or knurling of surface 104 may provide for increased gripping between a user's foot and the surface 104 by increasing friction therebetween. As another example, the L-shaped component 114 may comprise a padding covered by a fabric or leather material. Similarly, the padding or fabric may function to increase grip between the user's foot and the surface 104, as well as providing for an aesthetic appearance. In yet another example, the L-shaped component 114 may have a flat surface without texture or fabric.

The L-shaped component 114 may include a first (vertical) planar member 111 arranged to face the door and a second (horizontal) planar member 113 extending from a bottom end of the first planar member 111 outward from the door. The second planar member 113 may include a vertical protrusion 117 (also referred to as a lip structure) at an end opposite the first planar member 111 and configured to be engaged with by a user's foot to facilitate opening of the door through a pulling force applied, for example, by a toe and/or heel of the user's foot. A plurality of ribs 109 may extend from the protrusion 117 to the first planar member 111 and the second planar member 113. The plurality of ribs 109 may function to increase the structural rigidity of the L-shaped component 114 by increasing tensile strength at the intersection of second planar member 113 and first planar member 111.

Figure 10:
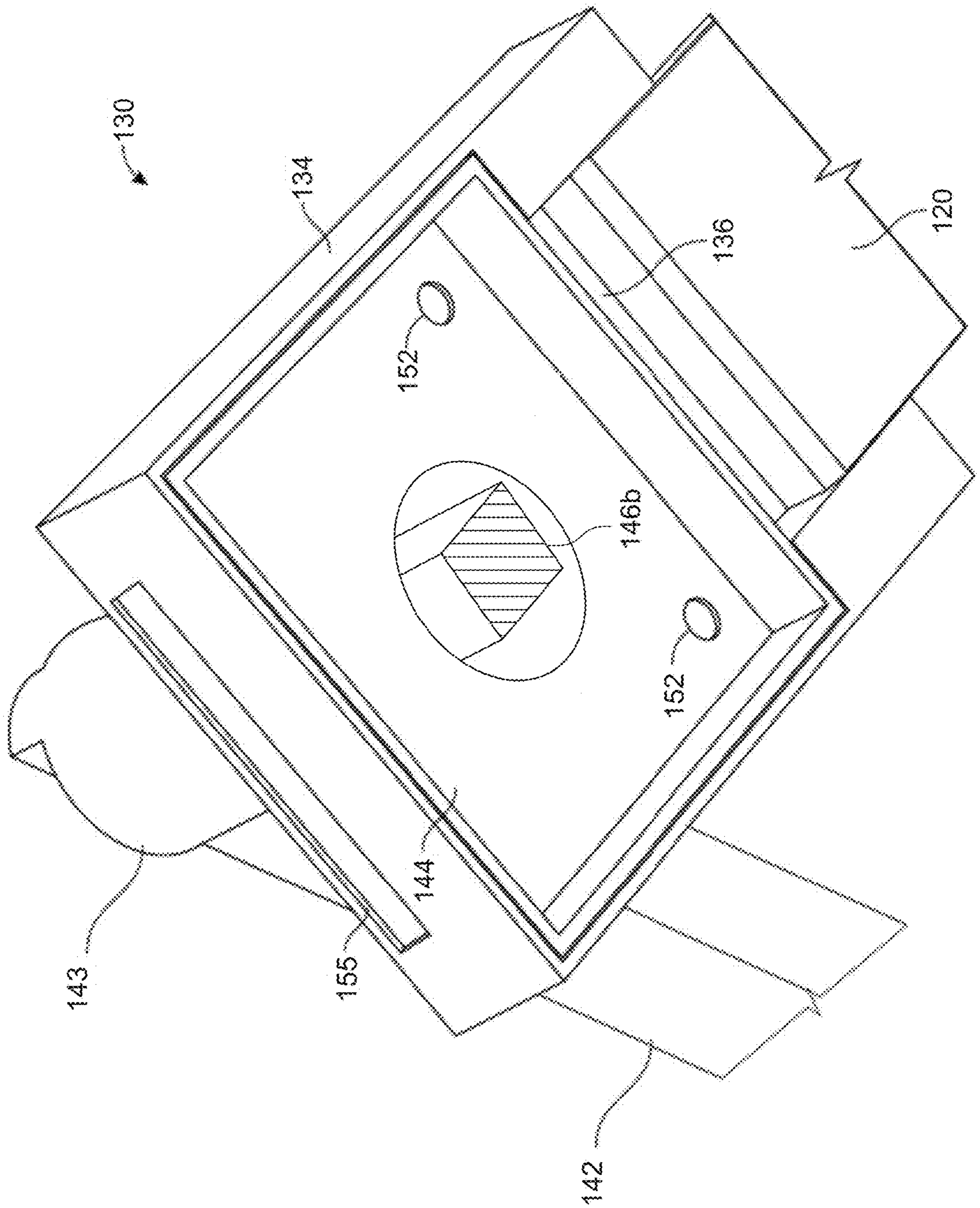
FIG. 10 is a schematic graphical representation of a back side view of the example door handle assembly of FIG. 5.

The L-shaped component 114 also comprises opening 119 extending down a central portion of the L-shaped component 114. The opening 119 has at least a first opening portion that extends from the upper end of the first planar member 111 toward the second planar member 113 and having a first width adapted to receive the arm member 120. A lower end of arm member 120 can be inserted into the opening 119 and coupled to the first planar member 111 via fastener components 108*a* and 108*b*. As used herein, fastener components may refer to any component that is able to permanently or removably attach one structure to another, such as but not limited to, bolts (as shown in FIG. 10), screws, nails, adhesive, suction cups, snaps, rivets, etc.

The L-shaped component 114 is adapted to convert a force exerted by foot operation of the user interaction assembly 110 into a translational force that is applied to arm member 120. For example, a translational force exerted parallel to the first planar member 111 exerts a similarly directed translational force on arm member 120 due to the coupling between the L-shaped component 114 and the arm member 120. The force applied to the arm member 120 can be transferred to the door handle operating assembly 130 via arm member 120 to operate the door handle assembly 140. For example, a user's foot may press downward on the L-shaped component 114 (e.g., pressing down on the second planar member 113 and/or protrusion 117), which pulls down on the arm member 120. This downward translational force is transferred to the door operating assembly 130 and causes the door handle operating assembly 130 to disengage the latch of the door handle assembly 140. Once disengaged, the user's foot may interact with the protrusion 117 to open the door toward the user using a horizontal pulling motion of their foot to pull the door toward the user. Thus, the user need not use their hands to operate the door handle or physically open the door. As another example, after pressing L-shaped component 114 to disengage the latch, the user's foot may horizontally push on L-shaped component 114 and/or vertical protrusion 117 to open the door away from the user.

In some embodiments, the vertical protrusion 117 may optionally comprise a toothed structure at an end of the protrusion 117 opposite the second planar member 113. An example toothed structure is shown in U.S. patent application Ser. No. 17/522,789, the disclosure of which is incorporated herein by reference in its entirety. The tooth structure may be provided to increase the grip of the user's foot with the protrusion 117. The increased grip ensures the user's foot is able to open the door without slipping off of the protrusion 117, which would result in closing the door. Other textured surfaces may be used in place of the toothed structure, for example, a knurled surface, textured surface, textured fabric or material, or the like.

Operation of the L-shaped component 114 by a downward force applied by the user is translated to a downward force applied to the arm member 120 via the physical coupling therebetween. The arm member 120 translates this force as a downward translational movement to the door handle operating assembly 130 which is converted to a rotational force to operate the door handle assembly 140, as will be described in more detail below in connection with FIGS. 5-10.

The user interaction assembly 110 may be optionally coupled to the door via the anchor component 112. The anchor component 112 may be physically coupled to the door by fastener components 107*a* and 107*b*. The anchor component 112 may include a step shaped profile when viewed from a horizontal direction parallel to the door (as shown in FIGS. 3A and 3B) having a main body component 116 and a cover or lip component 115 extending from the main body component 116 toward second planar member 113. The main body component 116 may comprise a channel 106 extending therethrough that is adapted to slidably receive the arm member 120. That is, for example, a portion of arm member 120 can be located within the channel 106 and held between the main body component 116 and the door. The cover component 115 may extend from the main body component 116 toward the L-shaped component 114 and overlap with a portion of the first planar member 111 (e.g., the first planar member 111 is positioned between the door and the cover component 115 in a direction perpendicular to the first planar member 111). A gap 118 may be formed between the main body component 116 and the upper end of the first planar member 111, with the gap 118 covered by the cover component 115. As shown in FIGS. 4A and 4B, the gap 118 is increased in distance between the upper end of the first planar member 111 and a lower end of the main body component 116 in the unlatched state (e.g., larger gap 118*a*) and is decreased in the latched state (e.g., smaller gap 118*b*).

In some embodiments, the L-shaped component 114 and the arm member 120 may be free floating relative to the door. For example, the arm member 120 and L-shaped component 114 may not be physically coupled directly to the door, and only held in place relative to the door due to attachment of the door handle operating assembly 130 to the door handle assembly 140. Accordingly, anchor component 112 can be used to restrain the arm member 120 (and the coupled L-shaped component 114) in lateral directions (e.g., horizontal directions) relative to the door, while permitting the arm member 120 (and coupled L-shaped component 114) to move in the vertical direction (e.g., longitudinal direction) relative to the door. Accordingly, anchor component 112 may be stationary relative to the door, while L-shaped component 114 and arm member 120 are laterally stationary and longitudinally nonstationary relative to the door.

FIGS. 5-10 are schematic graphical representations of the door handle operating assembly 130. With reference to FIGS. 5-10, the door handle assembly 140 includes a door handle 142 that interfaces with a housing (also referred to as a case or cover) 134 of the door handle operating assembly 130. The door handle operating assembly 130 also includes a push-lock mechanism or assembly 135 (e.g., FIGS. 6-9) physically coupled to the arm member 120 via fastener components. The push-lock assembly 135 is configured to rotate the door handle 142 to move the latch and disengage the latch from the strike plate of the door handle assembly 140. For example, operation of the L-shaped component 114 causes a signal (e.g., a force in this example) to be translated along arm member 120 that is applied to the push-lock assembly 135. The push-lock assembly 135 converts the translational force from arm member 120 to a rotational force that rotates the door handle 142, thereby disengaging the latch of the door handle assembly 140 from a strike plate of a door frame (not shown).

The door handle assembly 140 may include a lever door handle 142 for turning a spindle assembly 146, housed in a sleeve 143, configured to operate and disengage the latch (not shown) from a door frame (not shown). The spindle assembly 146 may comprise a spindle 146*b* (as shown in FIG. 10), a spindle interfacing component 146*a*, or a combination thereof. Thus, reference to spindle assembly 146 may refer to the spindle itself, the spindle interfacing component, or both. The door handle 142 also includes a mounting rose 144 attached to the door via mounting holes 152 configured to receive fastener components (e.g., screws holes, nail, holes, etc.) that covers and houses the internal components of the door handle assembly 140. Door handle 142 may be any type of doorknob, for example, a lever handle doorknob as shown in FIGS. 6-10, a round or oval doorknob, etc. The illustrative examples herein are described in connection with a lever style doorknob, but the embodiments herein will be equally applicable to any type of doorknob known in the art.

In the illustrative examples of FIGS. 5-10, the housing 134 may be positioned to receive and house the mounting rose 144. The housing 134 may comprise an opening 153 that slidably receives the arm member 120. The housing 134 operates to protect the internal components of door handle operating assembly 130 from external interference, such as from a user. Similarly, a user is thus unable to interact with the internal components that may otherwise hurt the user.

Figure 6:
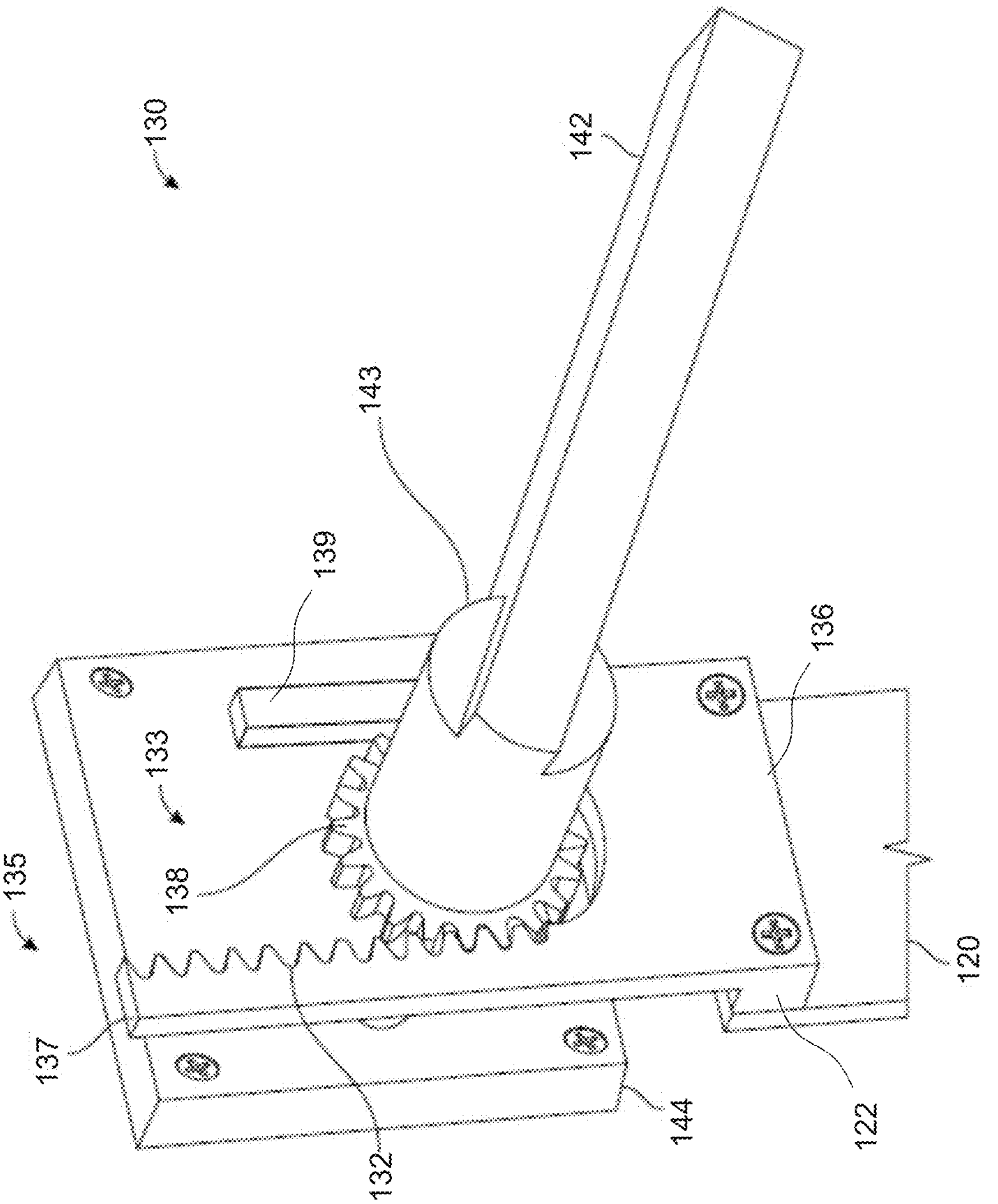
FIGS. 6-9 are schematic graphical representations of internal components of the example door handle operating assembly of FIG. 5, with a housing removed.
Figure 7:
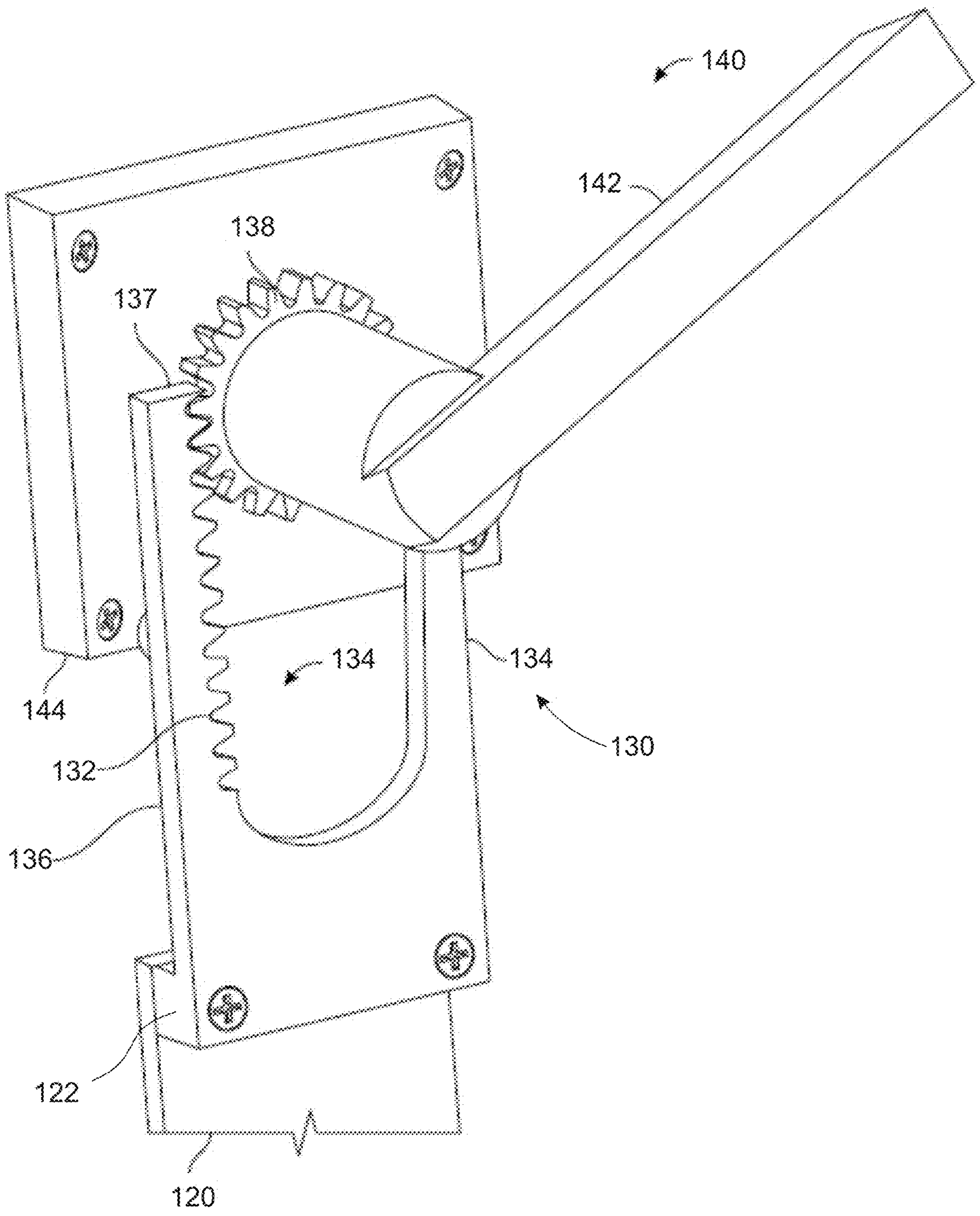
Figure 8:
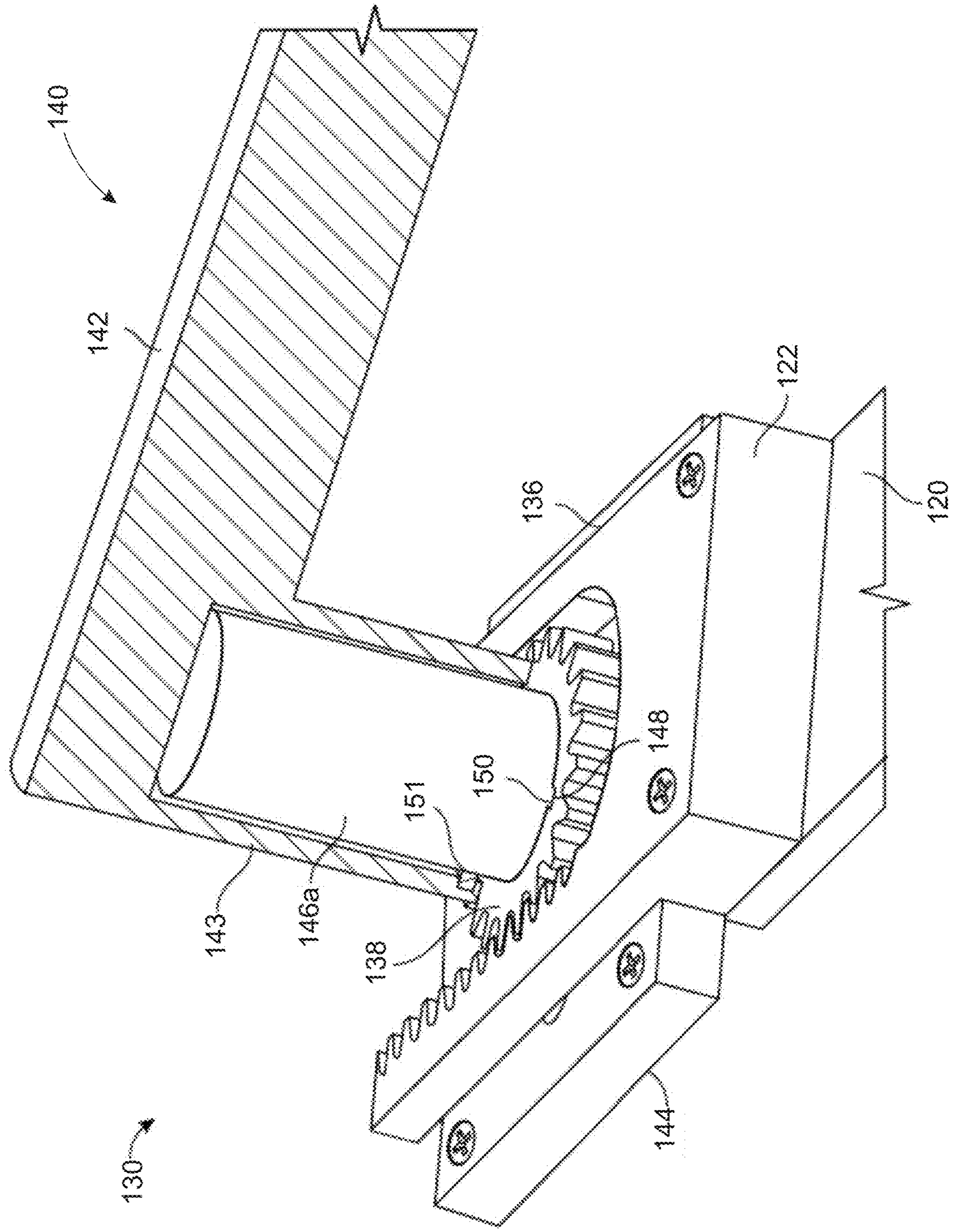

The push-lock assembly 135 may include a first component for receiving the signal from the arm member 120 and a second component interfaced with the first component and configured to convert the translational force from the arm member 120 to a rotational form applied to the door handle 142 (e.g., a lever or knob) and/or spindle assembly 146. For example, an end of the arm member 120 may be physically coupled to a plate 136 of the push-lock assembly 135, the plate 136 may be an example of the first component. In the illustrative examples of FIGS. 6-8, the plate 136 comprises at least an elongated member 137 extending vertically from a bottom portion of plate 136 adjacent to arm member 120 and defining an opening 133. The plate 136 comprises at least one internal rack 132 along a vertical internal edge of elongated member 137 (as shown in FIGS. 6-8). The internal rack 132 may also or alternatively be referred to as the first component of the push-lock assembly 135. In some embodiments, the plate 136 may include internal pinions (instead of rack F132) on one or more of the elongated members 137. In another embodiments, the opening 133 may include an internal gear. The length of the rack 132 should be at least long enough to accommodate full travel of the door handle 142.

In some embodiments, the plate 136 may also comprise an optional elongated member 139 extending vertically from the arm member 120 on a side of the pinion 138 opposite the elongated member 137. Elongated member 139 may act as a guide to keep the pinion 138 in contact with the rack 132. In one example, elongated member 137 may be longer than the elongated member 139. In another example, the member 137 and 139 may be the same length.

Figure 9:
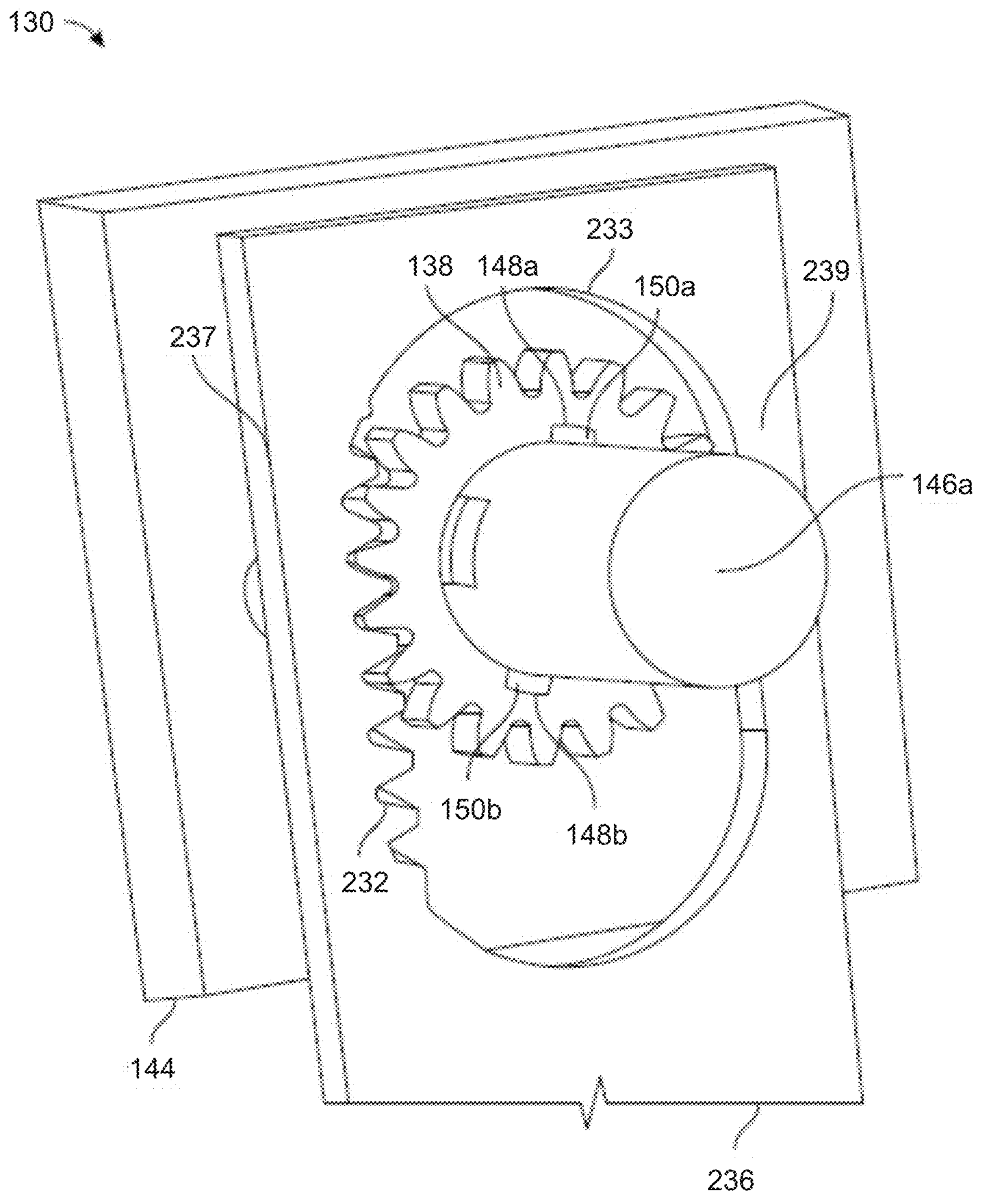

In another example, the opening may be an oval or stadium shaped opening, for example, opening 233 of plate 236 of FIG. 9. In this implementation, the opening comprises elongated members 239 and 237 (including rack 232), which are similar to elongated members 139 and 137, are connected as shown in FIG. 9. Furthermore, the opening 233 need not be ovular in shape, and may be circular, rectangular, rounded, etc.

The push-lock assembly 135 may also include pinion 138 (or other type of gear) (e.g., the second component) that can interface or otherwise engage with the rack 132. The pinion 138 may be physically coupled to and interlocked with the door handle assembly 140. Thus, a translational force applied to the arm member 120 causes the plate 136 to move in a direction responsive to the applied force, which rotates the pinion 138 via the internal rack 132 and turns the door handle 142.

In some embodiments, the plate 136 may include a protrusion 122 that couples the plate 136 to the arm member 120 via fastener components, for example, as shown in FIGS. 6-8. In another example, the arm member 120 may include a protrusion that couples to the plate 136 and the plate is substantially planar. Either protrusion may operate as to provide clearance for the plate 136 to be distances from the door so as to clear the mounting rose 144. The protrusion may also operate as a stop for the vertical movement of the plate by butting up against the mounting rose 144. In another example, protrusion 122 may extend from plate 136 and comprise an opening sized to receive arm member 120. The arm member 120 can be inserted and attached to plate 136 within the opening, for example, via fasteners. In yet another embodiment, arm member 120 may be provided with a thickness such that the surface of the arm member 120 contacts the plate 136, without protrusion 122.

In operation, when the user interaction assembly 110 is in the first state (e.g., as shown in FIG. 1 and FIG. 4B), the pinion 138 can be positioned at a first (closed) position within the opening 133 (e.g., the pinion 138 is located at approximately the middle of the rack 132) and the door handle assembly 140 is in a closed or latched position, as shown in FIG. 1. Operation of the user interaction assembly 110 to the second state, for example, by a downward force exerted on user interaction assembly 110 as shown in FIG. 2, causes the rack 132 to move in a vertical/downward direction (in the example shown in FIG. 6) and the rack 132 turns the pinion 138, which is translated to the handle 142 via interlocking of the pinion 138 with the spindle assembly 146 (e.g., spindle interfacing component 146*a* as shown in FIGS. 8 and 9). For example, pinion 138 may be affixed to a spindle interfacing component 146*a* and/or a spindle 148*a*. The pinion 138 maybe removably affixed to the spindle assembly 146, as described below in connection with FIGS. 8 and 9, or integrally formed into the spindle assembly 146, as described below in connection with FIGS. 15-17. When the user interaction assembly 110 is in the second state (e.g., as shown in FIG. 2 and FIG. 4B), the pinion 138 is positioned at a second position of the opening 133 (e.g., a lower portion of the opening 133), as shown in FIGS. 7 and/or 8, and the door handle assembly 140 is in an open or unlatched position, as shown in FIG. 2. Releasing the user interaction assembly 110 releases the force applied to arm member 120 and plate 136 to move in a vertical/upward direction. The pinion 138 turns the rack 132 as the door handle 142 returns to the closed or latched position, which brings the user interaction assembly 110 into the first position. For example, a spring or other mechanism of the door handle assembly 140 causes door handle 142 to return to a closed position upon release of user interaction assembly 110, which rotates the pinion 138 and causes the rack 132 to move. Movement of the rack 132 pulls plate 136 and arm member 120 in the vertical/upward direction and returns system 100 to the first state (e.g., latched or closed state).

In some embodiments, a portion of the plate 136 may be exposed from the housing 134 via opening 155 (as shown in FIG. 10). For example, when the user interaction assembly 110 is in the second state, an upper portion of the plate 136 may be positioned above the mounting rose 144 (FIGS. 6 and 8) and/or above the housing 134. In the first state, the plate 136 may be completely housed within the housing 134. In some embodiments, the plate 136 need not be exposed and may be completely housed by the housing in both states, for example by constructing a housing 134 large enough to house all internal components in any state, for example, as shown in FIGS. 1 and 2.

Openings 153 at the bottom side of the housing 134 (e.g., FIG. 5) and optional opening 155 (if present) form a guide or channel into which the arm member 120 may be received and guide the plate 136 up and down in the vertical direction while holding the plate 136 (and therefore the rack 132) in place in the other non-vertical directions (e.g., horizontally stationary). For example, a channel extending from opening 153 may comprise side walls formed within the housing 134 that receive an upper end of arm member 120 and a plate 136. During operation, the upper end of arm member 120 and plate 136 may be moved (e.g., sliding or other translational movement) in the vertical direction within the channel, while side walls of the channel restrain the arm member 120 and plate 136 from non-vertical translation movements.

Figure 18:
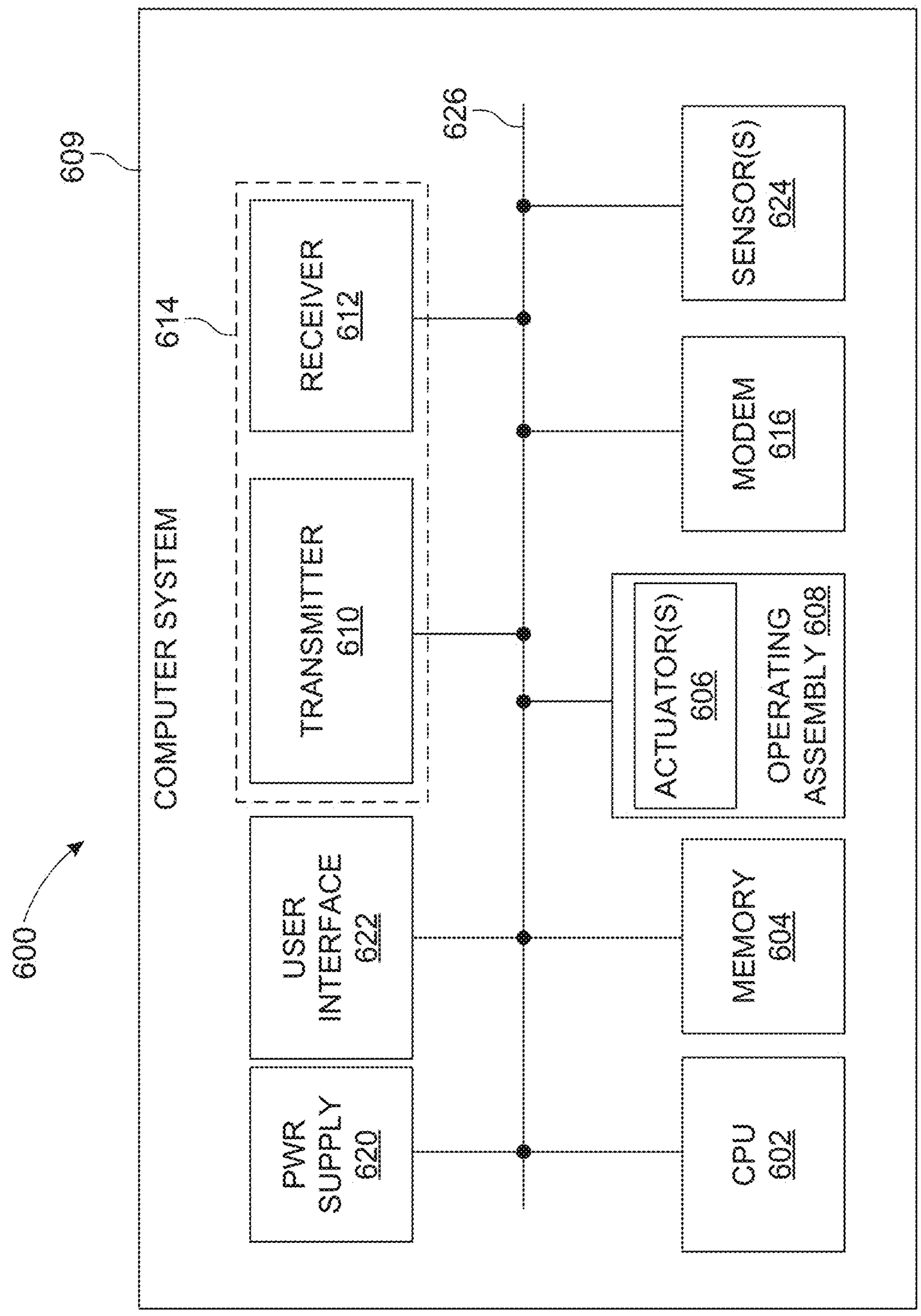
FIG. 18 is a functional block diagram of a wireless computing system that can be implemented with embodiments of the systems disclosed herein.

Embodiments herein may also permit normal operation of the door handle assembly 140 via a user operation of handle 142. For example, a user may operate the door handle assembly 140 by applying a downward force on the handle 142. The downward force rotates the spindle assembly 146 which is translated to pinion 138. Rotation of pinion 138 causes vertical translational movement of the plate 136 via the rack 132, which pulls on the arm member 120 and moves the user interaction assembly 110 into the second state. As another example, a user may apply an oppositely directed vertical force to the handle 142, rotating the spindle assembly 146 which is translated to pinion 138. Rotation of pinion 138 causes vertical translational movement of the plate 136 via the rack 132, such that the pinion 138 is located at a third position of the opening 133 (e.g., at an upper portion of the opening as shown in FIG. 18). The translation movement of the plate 136 applies a translational force on the arm member 120, which moves the user interaction assembly 110 into the third state in a direction opposite to the second state.

Another example is where the rack 132 can be positioned on, for example, the elongated member 139 (e.g., the opposite side of opening 133 of elongated member 137). In this configuration, directions of travel are reversed. For example, operation of the user interaction assembly 110 (e.g., pressing downward) results in upward movement of the plate 136. Upward travel of plate 136 is translated by interaction between the rack 132 on elongated member 139 and pinion 138 to cause the door handle 142 to rotate in an upward direction.

FIGS. 8 and 9 illustrate an example approach for interlocking the pinion 138 with the spindle assembly 146. Particularly, FIGS. 8 and 9 illustrate pinion 138 interlocked with a spindle interfacing component 146*a* and positioned between the mounting rose 144 and the handle 142. In some embodiments, pinion 138 may be located between the mounting rose 144 and the sleeve 143, while in other embodiments, pinion 138 may be housed within sleeve 143. FIG. 8 illustrates the system for handless operation of the door with the housing 134 removed and a cross sectional view of the door handle 142 and sleeve 143, so as to illustrate the interlocking of the pinion 138 to the spindle interfacing component 146*a*. The door handle 142 may be coupled to the spindle interfacing component 146*a* via an interfacing or locking member 151. FIG. 9 illustrates the system with the housing 134 and the door handle 142 removed, and another example plate 236 having a stadium shape. The upper end of opening 233 may operate as a stop. For example, as the plate 236 is pulled downward responsive to a downward force on arm member 120, the pinion 138 may move to the upper end of opening 233. As a result, downward travel of plate 236 may be ceased, preventing further rotation of the handle along with a stop to exerting downward force on user interaction assembly 110 (e.g., stopping downward travel of L-shaped component 114). Similarly, the lower end of opening 233 may operate as a stop for vertical travel of the plate 236.

In the illustrative example, the door handle 142 may comprise a collar that surrounds the spindle interfacing component 146*a*. The collar can include one or more notches 150 (e.g., two notches 150*a* and 150*b* of FIG. 16, collectively referred to as notches 150). The pinion 138 (or other component configured to translate the translation force to a rotational force) may include one or more recesses 148 (e.g., two recess 148*a* and 148*b* of FIG. 16, collectively referred to as recess 148) shaped to receive the notches 150, thereby physically coupling the pinion 138 to the spindle interfacing component 146*a*. The collar with notches 150 may be included as a part of the door handle assembly 140 (e.g., part of spindle interfacing component 146*a*) or may be an additional component that can be added to the door handle assembly 140.

In some implementations of door handle assembly 140, the spindle interfacing component 146*a* may be affixed to the collar and the notches may be configured to engage with the handle 142 via locking member 151, such that a rotational force may applied to the spindle interfacing component 146*a* via the notches 150 and operates the internal components to disengage the latch. Various embodiments of the door handle operating assembly 130 disclosed herein take advantage of the existing components of the door handle assembly 140 to operate the latch. For example, the pinion 138 is shaped, as described above, to engage with the existing notch 150 (e.g., as provided as an original, unaltered component of door handle assembly 140). In some embodiments, this may be achieved by removing (e.g., grinding, cutting, etc.) at least a portion of the sleeve 143 that engages with the notches to provide space for the pinion 138. In another example, the sleeve 143 need not be cut and may be pulled back from the notches 150 to permit the pinion 138 to be installed therein. In various embodiments, the recesses 148 may extend to less than the full extent of the notches, thereby leaving a portion of the notch to engage with the lever and permit use of the lever as well as the door handle operating assembly 130 as described herein. In another example, the pinion 138 may comprise additional notches (not shown) configured to engage with the sleeve 143 and operate in a manner substantively similar to notches 150, that pinion 138 may include notches that are used in place of notches 150. The notches on pinion 138 may be positioned over recess 148 such that the orientation of the lever is unchanged or may be positioned elsewhere about the spindle interfacing component 146*a*.

While notches and recesses are described herein for coupling the second component to the push-lock assembly 135 to the door handle assembly 140, other methods may be equally applicable. For example, the second component may be affixed to the door handle assembly 140 by an adhesive, threaded assembly, screws, fasteners, etc. Furthermore, various components disclosed herein are described as coupled or physically coupled to each other. Physical coupling may be done using any means known in the art, for example, screws, nails, adhesive, rivets, dowels, etc. Slidable movement may be achieved, for example at the upper end of foot pedal assemble 110 by selecting materials to provide sliding interfaces, lubrication, spacing, etc.

Further, while the notches 150 are describe as formed into the spindle interfacing component 146*a*, embodiment disclosed here are not intended to be limited to such a configuration. For example, notches 150 may be formed into the spindle 146*b* so to interlock the pinion 138 directly to the spindle 146*b*. Other implementations are possible as long as the pinion 138 is physically coupled to the spindle 146*b*, either directly or indirectly, such that rotation of pinion 138 cause as corresponding rotation on the spindle 146*a* in the same rotational direction.

The components disclosed herein may be made of any material as desired by the particular application. For example, one or more of the parts may be made of metal (e.g., zinc, brass, steel, aluminum, etc.), plastic, carbon fiber, etc. Any material may be used to form the parts, such that operation of the user interaction assembly 110 is translated to the door handle assemble 140 so as to operate the latch. For example, the arm member 120, L-Shaped component 114, and/or anchor component 112 may be made of metal (e.g., brass, aluminum or the like) or plastic materials. In the case of metal, the arm member 120 may be powder coated to avoid damage to the door. According to various embodiments, the anchor component 112, arm member 120, and/or plate 136 may also be made from a lubricious plastic material, such as, but not limited to, acetal resins (e.g., Delrin® produced and sold by DuPont™). According to various embodiments, the housing 134 may also be made of metal, such as die cast zinc, similar to most door handle or doorknob parts.

In some embodiments, the arm member 120, L-shaped component 114, anchor component 112, and/or plate 136 may be a singular, integral body. That is, these components maybe fabricated as a single unit out of, for example, plastic, die casting, 3D printing or the like. Production as a single unit may reduce manufacturing costs.

Figure 11:
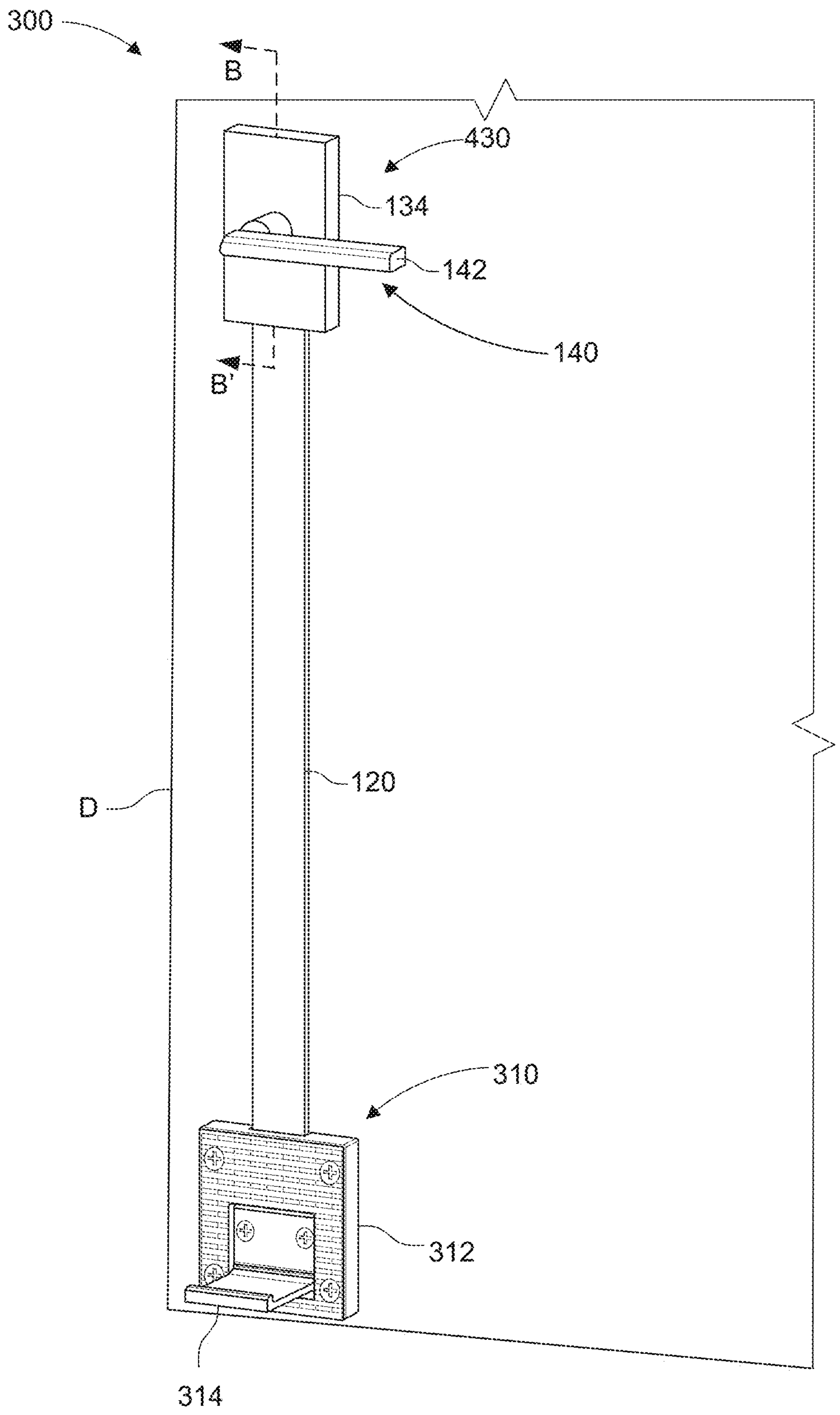
FIG. 11 is a schematic drawing of another embodiment of a system for handless operation of a door in accordance with an embodiment disclosed herein.

FIG. 11 is a schematic drawing of a system 300 for handless operation of a door D in accordance with an embodiment disclosed herein. System 300 is similar to system 100, except that system 300 comprises a user interaction assembly 310 that is coupled to communication medium 120 for communicating a signal to operating assembly 430 for operating the door handle assembly 140. User interaction assembly 310 is another example of a user interaction assembly configured for foot actuation to generate a signal, which can be communicated to the door handle operating assembly 430 via the communication medium 120, as described above. For example, a user may exert a downward translation force on L-shaped component 314 of the user interaction assembly 310, which pulls down on the arm member 120 to operate operating assembly 430 as describe above. The user interaction assembly 310 may be optionally coupled to the door via anchor component 312.

Figure 12A:
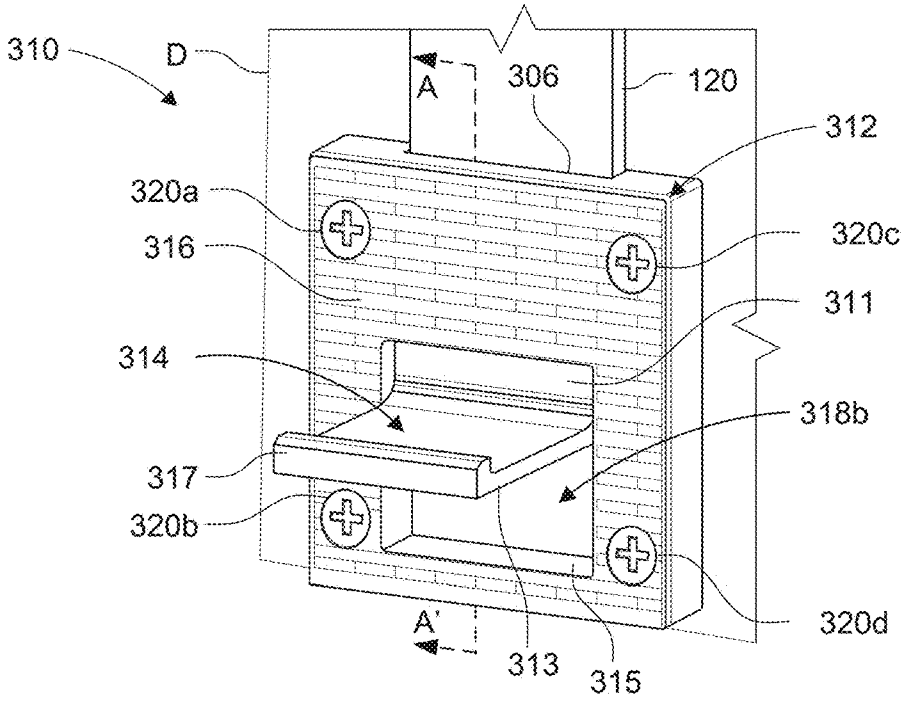
FIGS. 12A and 12B are schematic drawings of an example user interaction assembly of the system of FIG. 11.
Figure 12B:
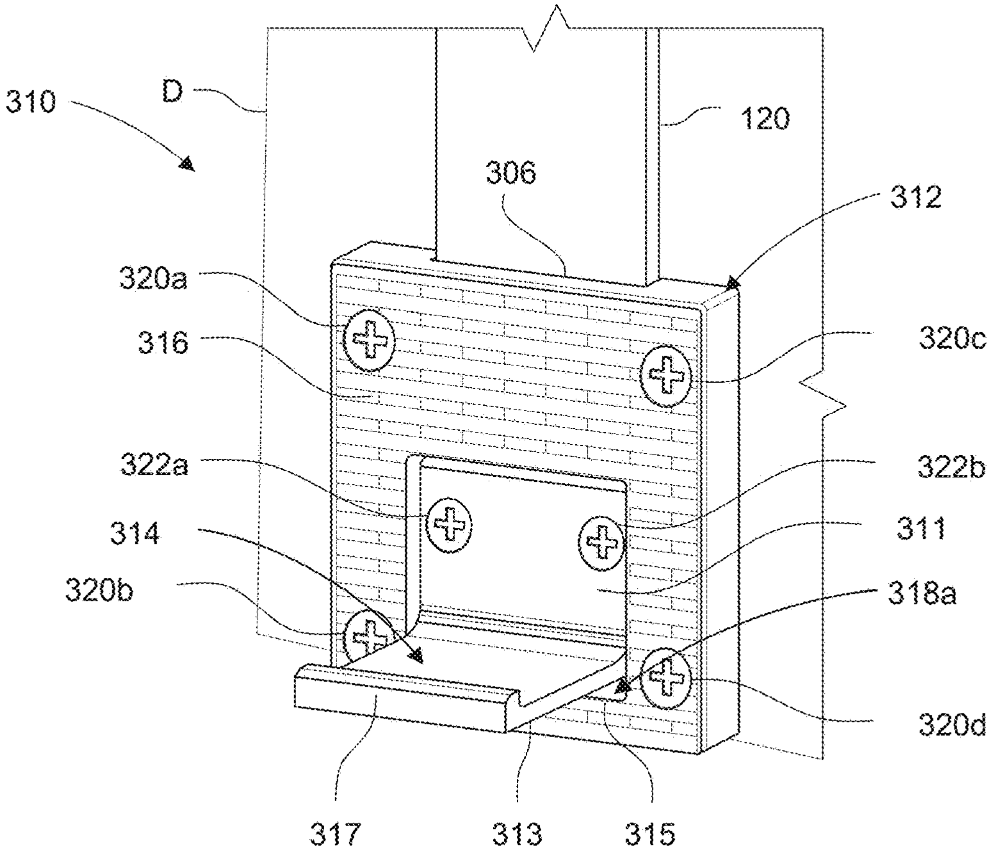
Figure 14:
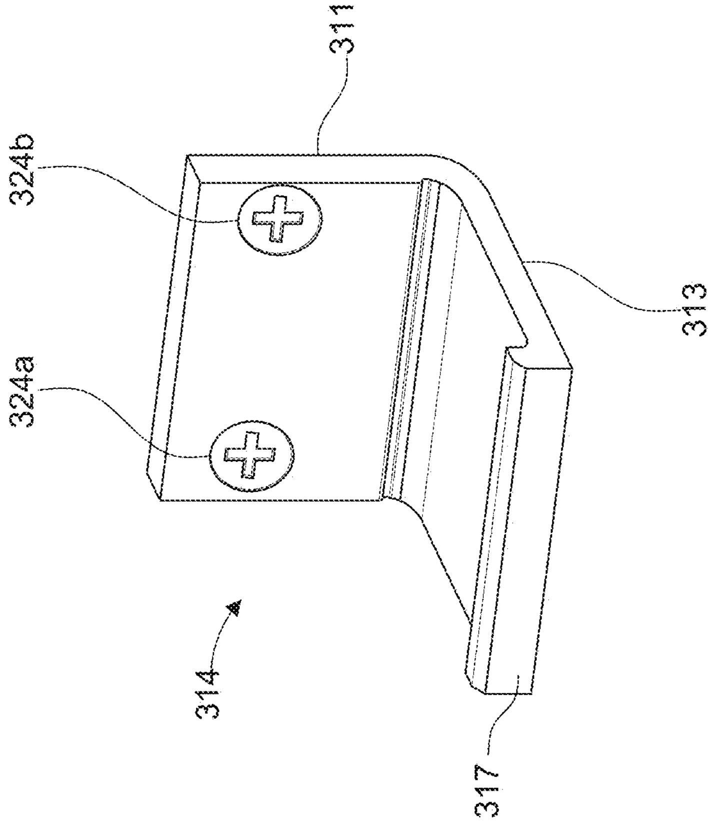
FIG. 14 is a schematic drawing of an example L-shaped component of the user interaction assembly of the system of FIG. 11.
Figure 13:
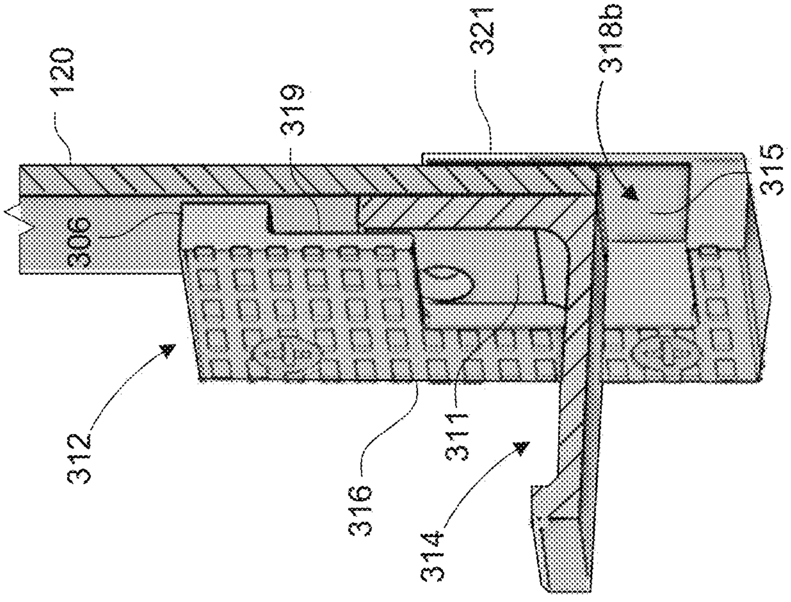
FIG. 13 is a cross-section of the user interaction assembly of FIG. 11 taken along the line A-A'.

FIGS. 12A-14 provide addition details of user interaction assembly 310 according to the example implementation of FIG. 11. FIGS. 12A and 12B provide schematic drawings of the user interaction assembly 310 in the unlatched state and the unlatched state, respectively. FIG. 13 is a cross-section of the user interaction assembly 310 taken along the line A-A' shown in FIG. 12A. FIG. 14 depicts the L-shaped component 314 with the arm member 120 and anchor component removed.

The user interaction assembly 310 comprises L-shaped component 314 and anchor component 312. The L-shaped component 314 may comprise a knurled surface or otherwise textured surface on which the user's foot interacts. As another example, the L-shaped component 314 may comprise a padding covered by a fabric or leather material. In yet another example, as shown in FIGS. 12A and 12B, the L-shaped component 114 may have a generally flat surface without texture or fabric.

The L-shaped component 114 may include a first (vertical) planar member 311 arranged to face the door and a second (horizontal) planar member 313 extending from a bottom end of the first planar member 311 outward from the door. The second planar member 313 may include a vertical protrusion 317 (also referred to as a lip structure) at an end opposite the first planar member 311 and configured to be engaged with by a user's foot to facilitate opening of the door through a pulling force applied, for example, by a toe and/or heel of the user's foot.

An upper end of the planar member 311 of the L-shaped component 314 can be affixed to a lower end of arm member 120. For example, planar member 311 may comprise holes 324*a* and 324*b* (as shown in FIG. 14) for receiving fastener components 322*a* and 322*b* that physically couple the upper end of planar member 311 to the lower end of arm member 120. In another example, the upper end of planar member 311 may include an opening (e.g., similar to opening 119 of FIGS. 3A and 3B) for receiving the lower end of arm member 120.

The L-shaped component 314 is adapted to convert a force exerted by foot operation of the user interaction assembly 310 into a translational force that is applied to arm member 120. For example, a translational force exerted parallel to the first planar member 311 exerts a similarly directed translational force on arm member 120 due to the coupling between the L-shaped component 314 and the arm member 120. The force applied to the arm member 120 can be transferred to the door handle operating assembly 430 via arm member 120 to operate the door handle assembly 140, for example, as described above in connection with FIGS. 3A-10.

In some embodiments, the vertical protrusion 317 may optionally comprise a toothed structure at an end of the protrusion 317 opposite the second planar member 313. An example toothed structure is shown in U.S. patent application Ser. No. 17/522,789, the disclosure of which is incorporated herein by reference in its entirety. The tooth structure may be provided to increase grip of the user's foot with the protrusion 317. The increased grip ensures the user's foot is able to open the door without slipping off of the protrusion 317, which would result in closing the door. Other textured surfaces may be used in place of the toothed structure, for example, a knurled surface, textured surface, textured fabric or material, or the like.

The user interaction assembly 310 may be optionally coupled to the door via the anchor component 312. The anchor component 312 may be physically coupled to the door by fastener components 320*a*-320*d*. In a case where fastener components 320*a*-320*d* are provided as bolts or the like, fastener components 320*a*-320*d* may be inserted into respective holes formed in anchor component 312. In another embodiment, along or in combination with bolts or the like, fastener components 320*a*-320*d* may include an adhesive placed on a rear surface of anchor component 312 interfacing with the surface of the door D so to affix the anchor component 312 to the door D. The use of adhesive may permit a removably attachment that does not necessitate forming holes into the door to receive bolts, screws, nails, or the like. The anchor component 312 may include a main body component 316 and an opening 315 formed in main body component 316. The main body component 316 includes an upper portion positioned between the L-shaped component 314 and the door handle operating assembly 430. In one example, the opening 315 may extend completely through main body component 316 forming a hole. In another example, opening 315 may extend partially through main body component 316 forming a planer member 321 on a side of L-shaped component 314 opposite cover component 319. Planar member 321 extend from the lower end of opening 315 toward the upper end of opening 315. Planar member 321 may be located between first planar member 311 and the door D so to space the arm member 120 away from the door D. In this way, the planar member 321 may operate to protect the door D from damage resulting from rubbing and/or friction between arm member 120 and the surface of the door D. The depth of opening 315 may be selected such that at least the entire depth of planar member 311 (e.g., thickness of 311 in a direction perpendicular to the door) is contained within opening 315. That is, for example, opening 315 comprises sides that surround the L-shaped component 314 in a plane parallel to the arm member 120 (e.g. generally parallel to the door). By housing the planar member 311 within opening 315, a likelihood of pinching or snagging a user's article or body part can be reduced.

The main body component 316 may also comprise a channel 306 extending from an upper surface of main body component 316 to the opening 315. More particularly, the channel 306 may extend through the upper portion of the main body component 316. Channel 306 is adapted to slidably receive the arm member 120. That is, for example, a portion of arm member 120 can be located within the channel 306 and held between the main body component 316 and the door.

Similar to anchor component 112 of FIGS. 1-4, anchor component 312 may comprise a lip or cover component 319 as shown in FIG. 13. That is, for example, the anchor component 312 may include a step shaped cross-sectional profile having a main body component 316 and a cover component 319 extending from an upper portion of the main body component 316 toward second planar member 313. Similar to the cover component 115 described above in connection with FIGS. 2A-3B, the cover component 319 of main body component 316 may extend from the upper portion of main body component 316 toward the L-shaped component 314 and overlap with a portion of the first planar member 311 (e.g., the first planar member 311 is positioned between the door and the cover component in a direction perpendicular to the first planar member 311) in a direction perpendicular to the face of arm member 120 opposite the door. A gap may be formed between the upper portion of main body component 316 and the upper end of the first planar member 311, with the gap covered by the cover component 319. This gap can be increased in distance between the upper end of the first planar member 311 and the upper portion of the main body component 316 in the unlatched state (e.g., larger gap) and decreased in the latched state (e.g., smaller gap).

The main body component 316 may also comprise knurling on a surface parallel to the door, as shown in FIGS. 12A-12B. The knurled surface may provide for improved grip between a user's foot and the user interaction assembly 310 by increasing friction therebetween. In another example, the main body component 316 may have other textured surfaces in place of the knurled surface. As another example, main body component 316 may comprise a padding covered by a fabric or leather material. In yet another example, the main body component 316 may have a generally flat surface absent added texture or fabric.

A gap 318 may be formed between the main body component 316 and the second planar member 313. As shown in FIGS. 12A and 12B, the gap 318 is increased in distance between the second planar member 313 and a lower end of the opening 315 in the latched state (e.g., as shown as gap 318*a* in FIG. 12A) and is decreased in the unlatched state (e.g., as shown as gap 318*b* in FIG. 12A). In some implementations, the opening 315 may define the length of travel of the L-shaped component 314, and thus the rotational travel provided by operating assembly 430. For example, a lower end of opening 315 may provide a stop for downward movement of the L-shaped component 314 (e.g., stopping travel of the L-shaped component 314 in the downward direction), while the upper end of opening 315 may provide a stop of upward movement. As described above, in some embodiments, door handle operating assembly 430 may also comprise a stop functionality, for example, by implementing plate 236. The stop functionality in the door handle operating assembly 430 may be used in place of or in combination with the stop functionality of the opening 315.

In some embodiments, the L-shaped component 314 and the arm member 120 may be free floating relative to the door. For example, the arm member 120 and L-shaped component 314 may not be physically coupled directly to the door, and only held in place relative to the door due to attachment of the door handle operating assembly 430 to the door handle assembly 140. Accordingly, anchor component 312 can be affixed to the door, as described above, and used to restrain the arm member 120 (and the coupled L-shaped component 314) in lateral directions (e.g., horizontal directions) relative to the door, while permitting the arm member 120 (and coupled L-shaped component 314) to move in the vertical direction (e.g., longitudinal direction) relative to the door. Accordingly, anchor component 312 may be stationary relative to the door, while L-shaped component 314 and arm member 120 are laterally stationary and longitudinally non-stationary relative to the door.

While main body component 316 is shown as a rectangular body with a rectangular opening, the present disclosure is not intended to be limited to only this implementation. Other shapes are possible. For example, main body component 316 may have a circular shape, ovular shape, stadium shape, or any desired shaped. Similarly, opening 315 may have any desired shape, which need not be the same as the shape of main body component 316.

System 100 and/or 300 may be implemented as a wireless system for operating a door handle according to some embodiments. In this case, an arm member may not be present and the communication medium may be a wireless communication interface. In this case, user interaction assembly 110 and/or 310 may function as a trigger and/or button that generates a signal communicated to door handle operating assembly 430. Door handle operating assembly 430 may comprise actuators (such as linear motors, hydraulic actuators, pneumatic actuators, electric actuators, and the like) coupled to plate 136 that are controlled responsive to receiving signal. The actuators may generate a translational force on plate 136 that operate the door handle assembly 140 as described above in connection with FIGS. 5-10. In another example, the user interaction assembly may comprise one or more sensors, such as motion sensors, pressure sensors, photoelectric sensors, thermal sensors, radar technology, object recognition from imaging devices such as cameras, infrared detectors, acoustic sensors, vibration sensors, etc. Sensors may be configured to detect the presence of a user foot (or another body part) and generate a signal responsive to the detection, which can be used to trigger door handle operating assembly 430.

Figure 16:
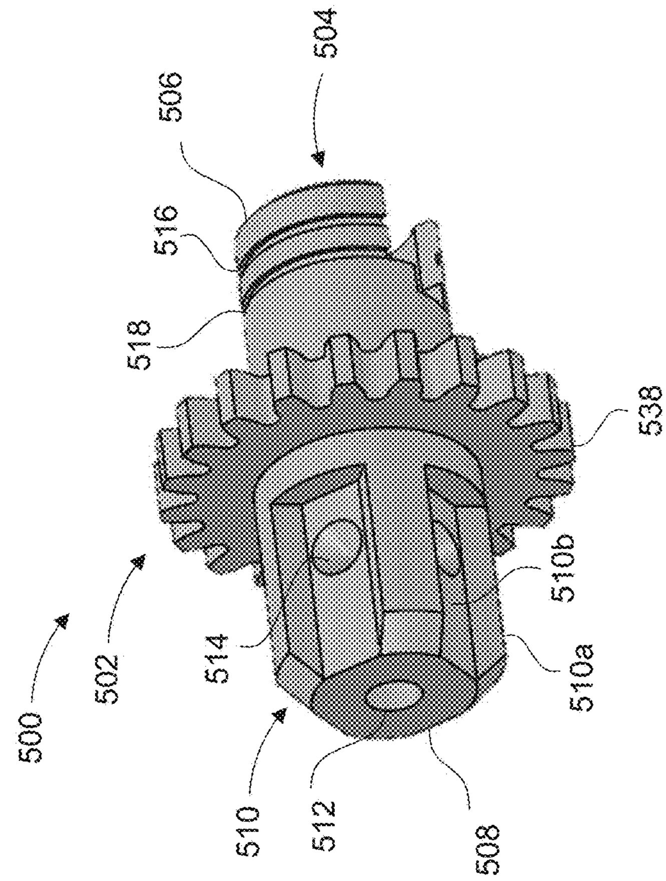
FIG. 16 is a graphical representation of a spindle interfacing component comprising a pinion according to an embodiment disclosed herein.
Figure 15:
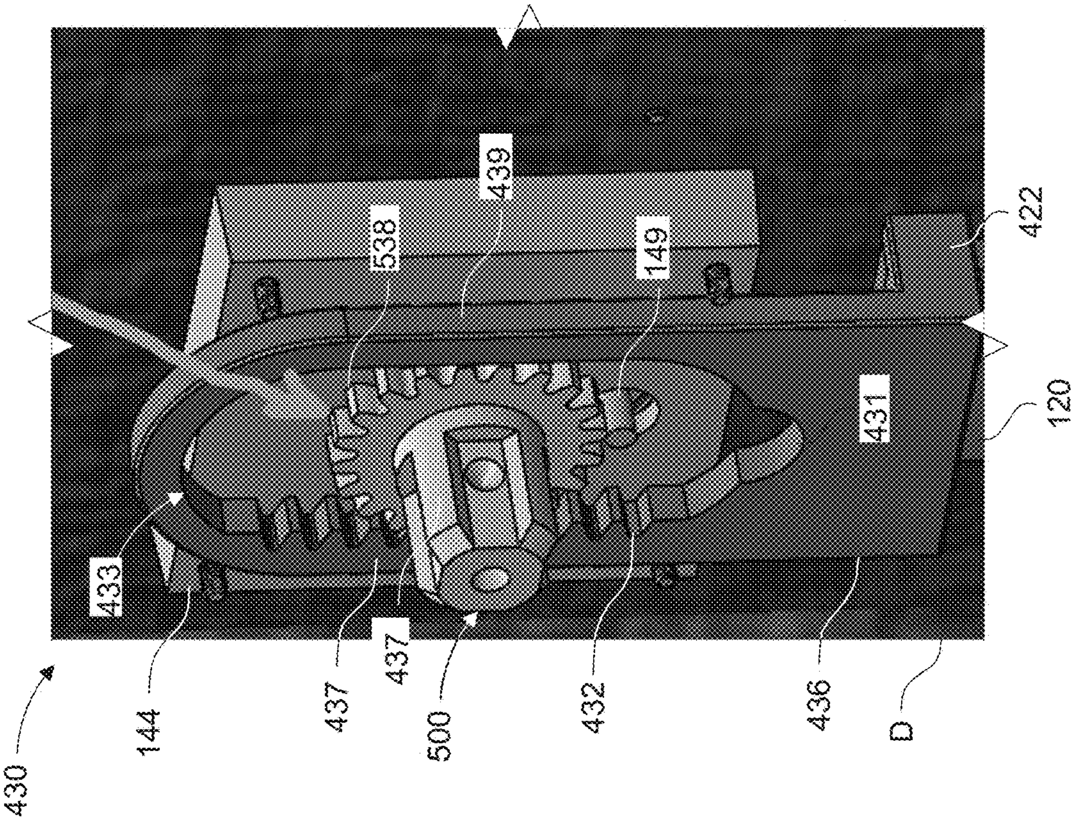
FIG. 15 is a graphical representation another example door handle operating assembly, with a housing removed, according to an embodiment of disclosed herein.
Figure 17:
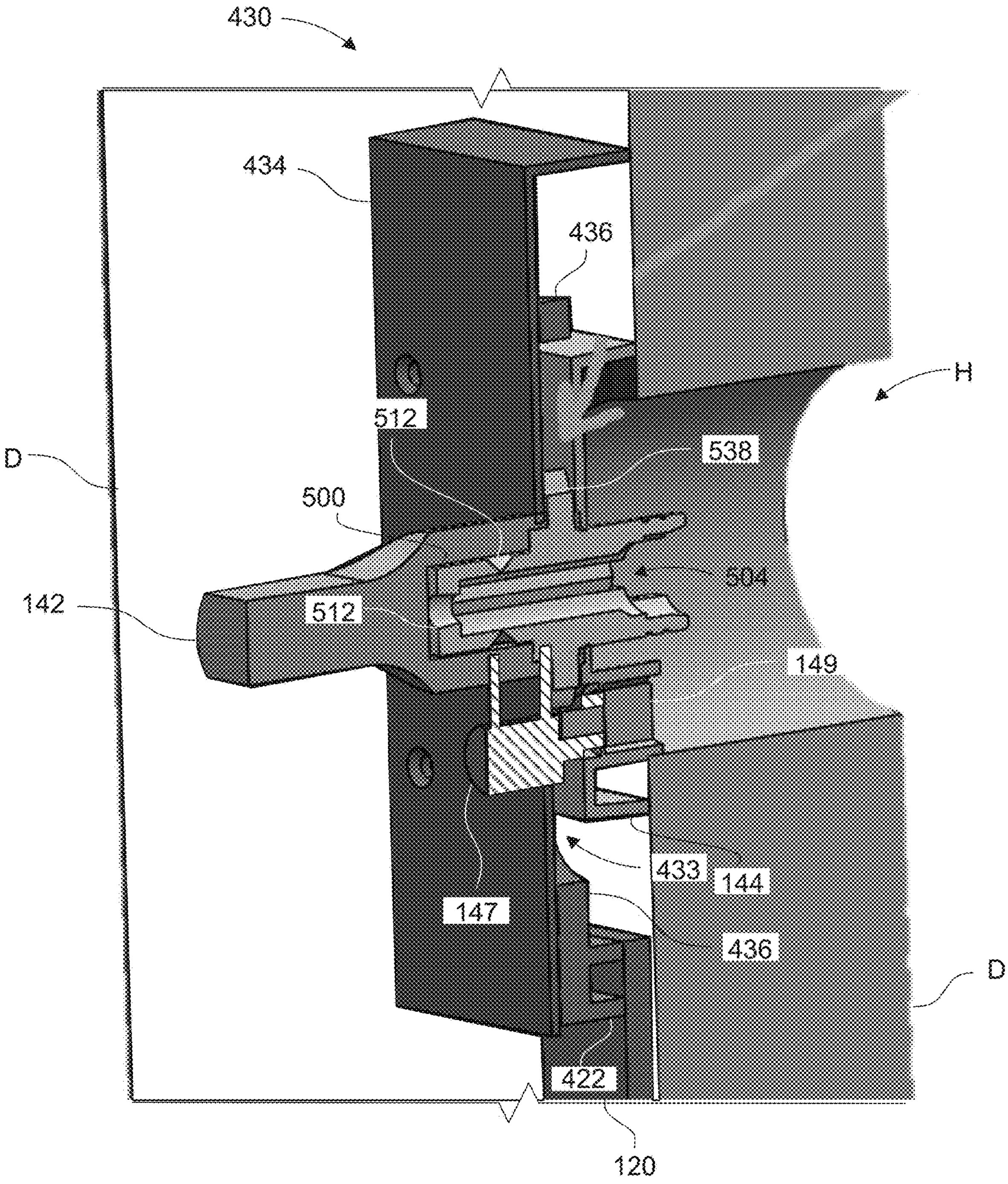
FIG. 17 is a cross section of the door handle operating assembly of FIG. 11 taken along the line B-B'.

FIGS. 15-17 are schematic graphical representations of another example door handle operating assembly 430 according to an embodiment of disclosed herein. FIG. 15 is a schematic view of the internal components of door handle operating assembly 430 with the housing removed. In this example, door handle operating assembly 430 comprises a plate 436, which may be substantially similar to plate 236, except as provided herein. Additionally, door handle operating assembly 130 in this example comprises a pinion 538, which is substantially similar to pinion 238, except that pinon 538 is integrally formed as part of spindle interfacing component 500.

As described above, plate 436 is physically coupled to arm member 120 for receiving a signal (e.g., translational force in this example) from arm member 120 and transferring the signal to the pinion 538. Plate 436 is physically coupled to arm member 120 via protrusion 422, which may be substantially similar to protrusion 122 described above in connection with FIGS. 6-8. Plate 436 also comprises an opening 433 that is similar to opening 233 described in connection with FIG. 9. Plate 436 include elongated member 437 extending vertically from a bottom portion of plate 436 and elongated member 439 and defining opening 433. An internal rack 432 is provided along a vertical internal edge of at least one of the elongated members, such as elongated member 437 as shown in FIG. 15.

In some embodiments, opening 433 may comprise a recess 431 provided at the lower end of the opening 433. The recess 431 may be shaped to accommodate a lock assembly, such may include lock cylinder housing a mechanism to operate a door lock and/or user interface component 149 for operating the lock (e.g., a key hole or thumb turn mechanism). In FIG. 15 an end of a lock cylinder 147 is shown, where the user interface component is removed.

FIG. 16 is a perspective view of an example spindle interfacing component 500 including pinion 538. FIG. 17 is a cross section of the door handle operating assembly 430 taken along the line B-B' showing spindle interfacing component 500 interlocked with door handle 142. FIG. 17 shows the door handle operating assembly 430 housed within housing 434, which is substantially similar to housing 134 described above. While not shown in FIG. 17, the spindle and additional components internal components housed by mounting rose 144 may be located within the hole H formed in the door to accommodate such components of the door handle assembly 140.

The spindle interfacing component 500 comprises a body 502 having a generally cylindrical shape. Spindle interfacing component 500 includes opening 504 at a proximal end 506 configured to receive a spindle (e.g., spindle 146*b*). The opening 504 may be shaped so to interlock with the spindle, for example, by having a square shape to receive and interlock with a square bar spindle. At a distal end 508, a plurality of ribs 510*a* alternating with recessed surfaces 510*b* form a handle interfacing structure 510 configured to interlock spindle interfacing component 500 with a corresponding structure provided in the handle. For example, sleeve 143 may house a interfacing structure configured to receive the handle interfacing structure 510 and physically couple the spindle interfacing component 500 to the handle. Thus, rotation applied to one of spindle interfacing component 500 and the handle is transferred to the other component. Additionally, a through hole 512 is provided to avoid a buildup of pressure when the spindle is inserted into opening 504 and dimples 514 are provided to receive fastener devices (e.g., set screws in one example) to secure spindle interfacing component 500 to the door handle. Spindle interfacing component 500 also comprises groove 516 and groove 518 configured to receive spring clip, such as c-clips, e-clips or the like.

As shown in FIG. 16, spindle interfacing component 500 comprises pinion 538 located at between handle interfacing structure 510 and proximal end 506. Pinion 538 may be formed to extend in a radial direction from a central longitudinal axis of spindle interfacing component 500, for example, from an outer surface of body 502 away from the central longitudinal axis, as shown in FIG. 16. In some embodiments, the pinion 538 may be provided at approximately the midpoint between distal end 508 and proximal end 506. The length of spindle interfacing component 500 may be provide to ensure that handle interfacing structure 510 fully engages with the receiving structure within the handle, and such that pinion 538 is engaged with internal rack 432.

As shown in the example of FIG. 17, the lock cylinder 147 may be received by user interface component 149, which the user may interact with to operate lock cylinder 147. In some embodiments, lock cylinder 147 may be offset in a vertical direction to accommodate the pinion 538. While in some embodiments, the user interface component 149 is unmodified relative to the door handle assembly 140. For example, a central axis of lock cylinder 147 may be aligned with a central axis of user interface component 149. Whereas, in the offset example, the central axes may be parallel by spaced part in the vertical direction to provide clearance for pinion 538.

While FIGS. 11-14 are described with reference to user interaction assembly 310 operating on arm member 120 to communicate a signal to door handle operating assembly 430, handle operating assembly 130 may be implemented with user interaction assembly 310. That is, user interaction assembly 310 may be operated to apply a vertical movement that is transferred to handle operating assembly 130, which operates the door handle assembly 140 as described above.

FIG. 18 is a functional block diagram of a wireless computing system 600 (also referred to herein as a processing system) that can be implemented with the systems disclosed herein, for example, the wireless system described above. The computing system 600 may be included and/or communicably coupled to the user interaction assembly (and/or sensors) and/or the door handle assembly according to the embodiments disclosed herein. In some embodiments, both assemblies may be coupled to the same or a different computing system 600.

The system 600 can include one or more processor units (processor) 602. The processor 602 can control operation of the system 600. The processor 602 can also be referred to as a central processing unit (CPU). The processor 602 can include multiple processors or microprocessors as needed. Processor 602 can perform all the functions required to allow the systems to perform according to programmable instructions and user interaction, for example, automated operation of the door. The processor 602 can include or be a component of a processing system implemented with one or more processors 602. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The system 600 can also have a memory 604 coupled to the processor 602. The memory 604 can include both read-only memory (ROM) and random access memory (RAM). The memory 604 can provide instructions and data to the processor 602. At least a portion of the memory 604 can also include non-volatile random access memory (NVRAM). The processor 602 can perform logical and arithmetic operations based on program instructions stored within the memory 604. In some implementations, the memory 604 can store multiple programs, for example, operation of the door based on received signals.

The processing system and the memory 604 can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The system 600 can have a plurality of actuators 606 coupled to the system 600 that can control the door handle operating assembly 608. The actuators 606 can be communicatively coupled to the processor 602. The processor 602 can execute instructions contained in the memory 604 to command movement of one or more of the plurality of actuators 606 to operate the door. The actuators 606 can be mechanical, electrical, electro-mechanical, pneumatic, hydraulic, etc. to accomplish movement of the various assemblies.

The system 600 can also include a transmitter 610 and/or a receiver 612 to allow transmission and reception of data between the components of system 600 (e.g., between the user interaction assembly and the handle assembly) and/or and a remote location. The transmitter 610 and the receiver 612 can be combined into a transceiver 610. Transmitter 610 and/or receiver 612 may be included at the user interaction assembly and the door handle operating assembly. The system 600 can also include (not shown) multiple transmitters, multiple receivers, multiple transceivers, and/or multiple antennas as needed for various communication standards via wireless or wireline communications. The system 600 can further have a modem 616 coupled to the transmitter 610, the receiver 612, or the transceiver 614. The modem 616 can perform modulation and demodulation tasks for communication with an external network, for example. In some implementations the processor 602 can communicate via the transmitter 610, the receiver 612, and/or the transceiver 614 via the Internet. In some embodiments, the transmitter 610 and the receiver 612 can be configured to transmit and receive information via other wired or wireline systems or means.

The system 600 can have a user interface 622. The user interface 622 can include one or more controls allowing user interaction by the user. For example, user interface 622 can include one or more of the foot pedal, door handle, input devices, speakers, and/or microphones to provide means for interaction with the system. A user can interact with the user interface 622 to operate the door.

The system 600 can further include one or more sensors 624 for detecting the presence of a user. For example, the sensor 624 can include one or more of motion sensors, pressure sensors, photoelectric sensors, thermal sensors, radar technology, object recognition from imaging devices such as cameras, infrared detectors, acoustic sensors, vibration sensors, etc. Sensor(s) 624 may be configured to detect the presence of a foot within the proximity of the sensor(s) 624.

The system 600 can further have a power supply 620. The power supply 620 can provide power to the system either via power backbone (e.g., AC power) or via battery.

The various components of the system 600 can be coupled together by a bus system 626. The bus system 626 can include a data bus, for example, as well as a power bus, a control signal bus, and a status signal bus in addition to the data bus. The components of the system 600 can be coupled together or accept or provide inputs to each other using some other mechanism. Bus system 626 may consist of multiple bus systems, for example, one for the user interaction assembly and one for the door handle operating assembly. In this case, for example, operating assembly 608 may include at least actuators 606, receiver 612, a first processor 602, and a first memory 604 coupled together on a first bus system, and a user interaction assembly may include at least sensor(s) 624, transmitter 610, a second processor 602, and a second memory 604 coupled together on a second bus system.

The components of the system 600 can be enclosed by a housing 609. The housing 609 can be the housing 134, the mounting rose 144, main body component 116, and/or main body component 316. For example, housing 609 may represent housing 134 in the case of a door handle operating assembly, which may house at least at least actuators 606, receiver 612, and the push-lock assembly 135. Additionally, processor 602, memory 604, modem 616, power supply 620, user interface 622, and transmitter 610 may be housed in housing 609 implemented as housing 134. In another example, housing 609 may represent main body component 116 and/or main body component 316, in which case housing 609 may house at least transmitter 610 and at least one of sensor(s) 624 and an L-shaped component (e.g., L-shaped component 114 or L-shaped component 314). Additionally, processor 602, memory 604, modem 616, power supply 620, user interface 622, and receiver 612 may be housed in housing 609 implemented as main body component 116 and/or main body component 316.

Although a number of separate components are illustrated in FIG. 18, one or more of the components can be combined or commonly implemented.

The hardware used to implement the various illustrative logics, logical blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program codes in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Thus, the claims are not intended to be limited to the aspects shown herein, but are to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," and "known," and terms of similar meaning should not be construed as limiting the item described to a given time period or to an item available as of a given time, but instead should be read to encompass conventional, traditional, normal, or standard technologies that may be available or known now or at any time in the future. Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system for hands free operation of a door, the system comprising:
- a pinion configured to attach to a spindle of a door handle external to a mounting rose of the door handle;
- an arm member having an upper end and a lower end;
- a foot pedal connected to the lower end of the arm member; and
- a plate connected to the upper end of the arm member, the plate having:
  - a first elongated member and a second elongated member;
  - an upper plate portion connected between the first and second elongated members, wherein the first and second elongated members extend in a direction from the upper end of the arm member to the upper plate portion;
  - an opening formed by the first and second elongated members and the upper plate portion, the opening configured to receive the pinion, wherein the first and second elongated members provide first and second sides of the opening; and
  - a rack formed on the first side of the opening of the plate and configured to engage with the pinion; and
  - a stop on an upper end of the opening formed by the upper plate portion,
- wherein operation of the foot pedal in a downward direction away from the plate causes a downward translational movement of the plate toward the foot pedal via the arm member, and the rack and pinion translate the downward translational movement applied to the plate to a rotational movement that rotates the spindle and operates the door handle, and
- wherein the stop is configured to halt the downward translational movement applied to the plate when the pinion contacts the stop.

2. The system of claim 1, wherein the foot pedal comprises an L-shaped component, the L-shaped component comprising a first planar member, and a second planar member extending from a lower end of the first planar member approximately perpendicular to the first planar member.

3. The system of claim 2, wherein the foot pedal further comprises a protrusion extending from an end of the second planar member opposite the first planar member, wherein the protrusion is configured to engage with a foot of a user to facilitate applying a pulling or pushing force to the L-shaped component by a foot of a user.

4. The system of claim 3, wherein the protrusion comprises a toothed surface configured to provide grip between the protrusion and the foot of a user.

5. The system of claim 2, further comprising a communication medium, wherein the downward translational movement of the plate is communicated to the plate via the communication medium.

6. The system of claim 5, wherein the communication medium is an arm member having lower end coupled to the foot pedal and an upper end coupled to the plate.

7. The system of claim 6, wherein the foot pedal further comprises an anchor component configured to attach to a door, at least a portion of the anchor component is positioned between the L-shaped component and the plate, the at least a portion of the anchor component comprising a channel configured to slidably receive the arm member.

8. The system of claim 7, wherein the anchor component comprises a body configured to surround the L-shaped component on a plane parallel to the door, wherein the anchor component comprises an opening configured to house the L-shaped component.

9. The system of claim 7, wherein the anchor component comprises a cover member extending from the at least a portion of the anchor component toward the second planar member of the L-shaped component, wherein the cover member is configured to cover a gap between the at least a portion of the anchor component and the first planar member of the L-shaped component.

10. The system of claim 1, wherein the opening is one of a stadium opening, a circular opening, an ovular opening, and a rounded rectangular opening.

11. An apparatus for operating a door handle assembly for hands free operation of a door, the apparatus comprising:

a bracket comprising:

a first planar member, and a second planar member extending approximately perpendicular from the first planar member;

an arm member extending from a first end connected to the first planar member to a second end in a first direction approximately parallel to the first planar member; and a push-lock mechanism at the second end of the arm member, the push-lock mechanism comprising:

a pinion configured to attach to the door handle assembly at a position external to a mounting rose of the door handle assembly, and a plate coupled to the second end of the arm member, the plate having an ovular-shaped opening configured to receive the pinion, the ovular-shaped opening comprising an ovular cylinder surface that surrounds the pinion and a rack formed a first portion of the ovular cylinder surface extending in the first direction, and the rack is configured to engage with the pinion, wherein a force in the first direction away from the push-lock mechanism applied to the bracket exerts translational movement to the plate via the arm member in the first direction towards the bracket, and the rack and pinion translate the translational movement on the plate to a rotational movement that rotates a handle of the door handle assembly and operates the door handle, and wherein the ovular-shaped opening comprises a stop at a second portion of the ovular cylinder surface extending in a second direction that is perpendicular to the first direction and parallel to the first planar member, the stop is configured to halt the translational movement of the plate when the pinion contacts the second portion of the ovular cylinder surface as a result of the translational movement on the plate in the first direction.

12. The apparatus of claim 11, wherein the bracket further comprises a protrusion extending from an end of the second planar member opposite the first planar member, wherein the protrusion is configured to engage with a foot of a user to facilitate applying a pulling or pushing force to the bracket by a foot of a user.

13. The apparatus of claim 12, wherein the protrusion comprises a toothed surface configured to provide grip between the protrusion and the foot of a user.

14. The apparatus of claim 11, further comprising an anchor component configured to attach to the door, at least a portion of the anchor component is positioned between the bracket and the push-lock mechanism, the at least a portion of the anchor component comprising a channel configured to slidably receive the arm member.

15. The apparatus of claim 14, wherein the anchor component comprises a body configured to surround the bracket on a plane parallel to the door, wherein the anchor component comprises an opening configured to house the bracket.

16. The apparatus of claim 15, wherein the anchor component comprises a cover member extending from the at least a portion of the anchor component toward the second planar member of the bracket, wherein the cover member is configured to cover a gap between the at least a portion of the anchor component and the first planar member of the bracket.

17. The apparatus of claim 11, wherein the ovular-shaped opening is a stadium-shaped opening.

* * * * *